United States Patent
Valouch et al.

(10) Patent No.: US 11,162,843 B2
(45) Date of Patent: Nov. 2, 2021

(54) SPECTROMETER DEVICE AND SYSTEM

(71) Applicant: trinamiX GmbH, Ludwigshafen am Rhein (DE)

(72) Inventors: Sebastian Valouch, Ludwigshafen (DE); Robert Gust, Ludwigshafen (DE); Bertram Feuerstein, Ludwigshafen (DE); Robert Send, Ludwigshafen (DE); Ingmar Bruder, Ludwigshafen (DE)

(73) Assignee: trinamiX GmbH, Ludwigshafen am Rhein (DE)

( * ) Notice: Subject to any disclaimer, the term of this patent is extended or adjusted under 35 U.S.C. 154(b) by 0 days.

(21) Appl. No.: 16/771,674

(22) PCT Filed: Dec. 12, 2018

(86) PCT No.: PCT/EP2018/084508
§ 371 (c)(1),
(2) Date: Jun. 10, 2020

(87) PCT Pub. No.: WO2019/115594
PCT Pub. Date: Jun. 20, 2019

(65) Prior Publication Data
US 2021/0072082 A1 Mar. 11, 2021

(30) Foreign Application Priority Data
Dec. 13, 2017 (EP) .................................. 17206939

(51) Int. Cl.
*G01J 3/28* (2006.01)
*G01J 3/02* (2006.01)
(Continued)

(52) U.S. Cl.
CPC .......... *G01J 3/2803* (2013.01); *G01J 3/0208* (2013.01); *G01J 3/0216* (2013.01); *G01J 3/0289* (2013.01);
(Continued)

(58) Field of Classification Search
CPC ...................................................... G01J 3/2803
(Continued)

(56) References Cited

U.S. PATENT DOCUMENTS 5,615,673 A    4/1997   Berger et al.
9,717,425 B2 *   8/2017   Kiani ................. A61B 5/02427
(Continued)

FOREIGN PATENT DOCUMENTS

JP        H04326028 A    11/1992
WO     2012110924 A1    8/2012
(Continued)

OTHER PUBLICATIONS

Madala and R.F. Boehm, Effect of reflection losses on stationary dielectric-filled non-imaging concentrators, J. Photonics for Energy 6(4), 047002, 2016, 15 pages.
(Continued)

*Primary Examiner* — Tarifur R Chowdhury
*Assistant Examiner* — Omar H Nixon
(74) *Attorney, Agent, or Firm* — Armstrong Teasdale LLP

(57) ABSTRACT

Described herein are a spectrometer system and a spectrometer device, which are suited for investigation or monitoring purposes, in particular, in the infrared (IR) spectral region, and for a detection of heat, flames, fire, or smoke.
The spectrometer device allows capturing incident light from object and transferring the incident light to a length variable filter with a particularly high concentration efficiency. Apart from the spectrometer device, the spectrometer system further includes an evaluation unit designated for
(Continued)

determining information related to a spectrum of an object by evaluating the detector signals provided by the spectrometer device.

15 Claims, 5 Drawing Sheets

(51) Int. Cl.
  *G01J 3/10* (2006.01)
  *G01J 3/26* (2006.01)
  *G01J 5/00* (2006.01)
  *G01J 5/60* (2006.01)
  *G01J 3/12* (2006.01)

(52) U.S. Cl.
  CPC . *G01J 3/10* (2013.01); *G01J 3/26* (2013.01); *G01J 5/0014* (2013.01); *G01J 5/602* (2013.01); *G01J 2003/1234* (2013.01)

(58) Field of Classification Search
  USPC .......................................................... 356/326
  See application file for complete search history.

(56) References Cited

U.S. PATENT DOCUMENTS

| | | | |
|---|---|---|---|
| 2004/0021861 A1* | 2/2004 | Lewis | G01J 3/02 356/326 |
| 2004/0032584 A1 | 2/2004 | Honda et al. | |
| 2006/0065833 A1 | 3/2006 | Craig et al. | |
| 2008/0156969 A1 | 7/2008 | Ehbets | |
| 2013/0120754 A1 | 5/2013 | Wilson et al. | |
| 2014/0131578 A1 | 5/2014 | Hruska et al. | |
| 2015/0204833 A1* | 7/2015 | O'Brien | G01J 3/26 250/339.01 |
| 2015/0219494 A1* | 8/2015 | Hruska | G01J 3/2803 356/326 |
| 2016/0305820 A1* | 10/2016 | Zollars | G01J 3/2823 |
| 2016/0356720 A1 | 12/2016 | Van Dorpe et al. | |
| 2017/0038255 A1* | 2/2017 | Smith | G01J 3/0229 |
| 2017/0323057 A1* | 11/2017 | Karvela | G06F 1/163 |
| 2017/0336319 A1* | 11/2017 | Hruska | G01N 21/359 |

FOREIGN PATENT DOCUMENTS

| | | |
|---|---|---|
| WO | 2014097181 A1 | 6/2014 |
| WO | 2014198625 A1 | 12/2014 |
| WO | 2016120392 A1 | 8/2016 |

OTHER PUBLICATIONS

Lun J. and R. Winston, Asymmetric design for compound elliptical concenlialors (CEO) and its geometric flux implications, Proc. of SPIE, 9572, 2015, 8 pages.

Morton Hamermesh, Group Theory and its application to physical problems, Dover Publications, Mineola, N.Y. 1989, Chapter 2, Symmetry Groups, pp. 32-67.

International Search Report and Written Opinion for corresponding PCT/EP2018/084508 dated Jul. 19, 2018, 20 pages.

* cited by examiner

SPECTROMETER DEVICE AND SYSTEM

CROSS-REFERENCE TO RELATED APPLICATIONS

This application is a U.S. National Phase Application of PCT/EP2018/084508, filed Dec. 12, 2018, which claims the benefit of priority to European Patent Application No. 17206939.5, filed Dec. 13, 2017, the entire contents of which are hereby incorporated by reference herein.

FIELD OF THE INVENTION

The invention relates to a spectrometer device to a spectrometer system comprising the spectrometer device, and to various uses of the spectrometer device and the spectrometer system. Such devices and systems can, in general, be employed for investigation or monitoring purposes, in particular, in the infrared (IR) spectral region, especially in the near-infrared (NIR) and the mid infrared (MidIR) spectral regions, and for a detection of heat, flames, fire, or smoke. However, further kinds of applications are possible.

PRIOR ART

Various spectrometer devices and systems for investigations in the infrared (IR) spectral region, especially in the near-infrared (NIR) spectral region, are known. Especially, spectrometer devices which comprise a combination of a linearly variable filter (LVF) and a detector array have already been proposed. Herein, the LVF is designated for separating light captured from an object into a spectrum of constituent wavelength signals while the detector array includes a plurality of pixels, wherein each of the plurality of pixels is disposed to receive at least a portion of a plurality of the constituent wavelength signals that provides a power reading for each constituent wavelength. Typically, in order to accomplish that the incident light may impinge the LVF in a manner normal to a receiving surface of the LVF, a baffle is used for this purpose, which, however, generally results in a low light throughput and a poor signal-to-noise ratio.

US 2014/131578 A1 discloses a portable spectrometer device which includes an illumination source for directing at a sample as well as a tapered light pipe (TLP) for capturing the light which interacts with the sample at a first focal ratio and for delivering the light at a second focal ratio lower than the first focal ratio to the LVF. Preferably, the TLP is lensed at one end, and recessed in a protective boot with stepped inner walls. In addition, a gap between the TLP and LVF is minimized to further enhance resolution and robustness. It is emphasized here, that the TLP disclosed herein can also be denoted by the term "optical concentrator device", wherein the optical concentrator device is operated in reverse direction for spreading out the captured light and reducing an angular spread of the captured light, wherein the optical concentrator device comprises a conical shape.

However, as, for example, described by S. Madala and R. F. Boehm, *Effect of reflection losses on stationary dielectric-filled non-imaging concentrators*, J. Photonics for Energy 6(4), 047002, 2016, optical concentrator devices comprising a conical shape suffer from a low concentration efficiency. As further described by S. Madala et al., effects of Fresnel reflection and total internal reflection (TIR) losses on performance parameters in refractive-type non-imaging solar concentrators affect performance parameters and, thereby, energy collection. For this purpose, S. Madala et al. carried out a raytracing analysis in order to illustrate the effects of Fresnel reflection and TIR losses on four different types of stationary dielectric-filled non-imaging concentrators, including a conic concentrator (V-trough concentrator), a compound parabolic concentrator (CPC), a compound elliptical concentrator (CEC), and a compound hyperbolic concentrator (CHC). According to their findings, the refractive index (RI) of a dielectric fill material determines the acceptance angle of a solid non-imaging concentrator. Larger refractive indices yield larger acceptance angles and, thereby, larger energy collection, however, they also increase the Fresnel reflection losses.

Lun J. and R. Winston, *Asymmetric design for compound elliptical concentrators (CEC) and its geometric flux implications*, Proc. of SPIE, 9572, 2015, provide a theoretical treatise on asymmetric compound elliptical concentrators (CEC) as a further non-imaging optical element. Herein, they set out that a conventional way of understanding an ideal concentrator is based on maximizing the concentration ratio based on a uniformed acceptance angle. Although such an angle does not exist in the case of a CEC, the thermodynamic laws still hold and concentrators have been contemplated with a maximum concentration ratio allowed by them by using a string method to solve this general problem. As a result, groups of ideal concentrators using geometric flux field or a flowline method have been obtained.

US 2013/120754 A1 discloses a device and a method in which a Fizeau wedge interference filter is disposed between a focal plane array (FPA) and a visible scene with an increasing wedge filter dimension varying along a scan direction. Herein, the scene is scanned along the FPA in order to obtain light intensity measurements of a given scene location at different times using different FPA sensor elements through different wedge filter thicknesses. The device may be arranged in a manner that incident light is transferred to the FPA sensor elements along a light path which is asymmetric with respect to the optical axis of the device. Herein, the optical element is a lens.

US 2006/065833 A1 discloses an optical channel monitoring device using a linear variable filter (LVF) disposed in the path of a beam of light for selectively transmitting light in a variable manner along a length of the filter, a photodetector array positioned in the path of light transmitted through the LVF for measuring spectral characteristics of the transmitted light, and collimating means disposed between the input port and the LVF for collimating the beam of light. The device may be arranged in a manner that incident light is transferred to the photodetector array along a light path which is asymmetric with respect to the optical axis of the device. Herein, the optical element comprises a cylindrical lens.

US 2008/156969 A1 discloses an asymmetrically arranged optical deflector element, a bandpass filter array and a detector array. Herein, the optical deflector element which functions as the optical element spectrally shifts the effective bandpass curves of the bandpass filters of all the filter groups except one so that the effective bandpass curves of all the bandpass filters have different spectral positions. As a result, a multiplication of the filter channels can be achieved by using only a few different bandpass filters.

JP H04 326028 A discloses a measuring light which consists of a luminous flux being emitted from an area restricted in a one-dimensional direction with a slit to be turned to a parallel flux with a collimation means and diffused by a beam diameter converting means and a complex interference filter device with a two-dimensional intensity distribution measuring means. The optical element comprises lenses. The asymmetry of the device is introduced by the specific arrangement of the detector.

U.S. Pat. No. 5,615,673 A discloses a compound parabolic concentrator (CPC) which is used for optically collecting Raman scattered light returning from a region of interest. Herein, the CPC is a non-imaging optical element used in normal configuration to convert light radiated over a full hemisphere into a narrow cone which can be collected by conventional optics, including optical fibers and lenses.

PROBLEM ADDRESSED BY THE INVENTION

Therefore, the problem addressed by the present invention is that of providing a spectrometer device and a spectrometer system which may, particularly, be suited for investigations in the infrared (IR) spectral region, especially in the near-infrared (NIR) spectral region, and which at least substantially avoid the disadvantages of known devices and systems of this type.

In particular, it would be desirous to have an improved simple, cost-efficient and, still, reliable spectrometer device having an optical element designed for capturing light from an object and transferring the captured light to a linearly variable filter with a higher concentration efficiency as currently available.

SUMMARY OF THE INVENTION

This problem is solved by the invention with the features of the independent patent claims. Advantageous developments of the invention, which can be implemented individually or in combination, are presented in the dependent claims and/or in the following specification and the detailed embodiments.

As used herein, the expressions "have", "comprise" and "contain" as well as grammatical variations thereof are used in a non-exclusive way. Thus, the expression "A has B" as well as the expression "A comprises B" or "A contains B" may both refer to the fact that, besides B, A contains one or more further components and/or constituents, and to the case in which, besides B, no other components, constituents or elements are present in A.

In a first aspect of the present invention, a spectrometer device is disclosed. Accordingly, the spectrometer device comprises an optical element designed for receiving incident light from an object and transferring the incident light to a length variable filter, wherein the optical element is arranged in a manner that the incident light is transferred to the length variable filter along a light path which is asymmetric with respect to an optical axis of the spectrometer device;

the length variable filter which is designated for separating the incident light into a spectrum of constituent wavelength signals; and a detector array comprising a plurality of pixelated sensors, wherein each of the pixelated sensors is adapted to receive at least a portion of one of the constituent wavelength signals, wherein each of the constituent wavelength signals is related to an intensity of each constituent wavelength.

The "object" may, generally, be an arbitrary body, chosen from a living object and a non-living object. Thus, as an example, the at least one object may comprise one or more articles and/or one or more parts of an article, wherein the at least one article or the at least one part thereof may comprise at least one component which may provide a spectrum suitable for investigations. Additionally or alternatively, the object may be or may comprise one or more living beings and/or one or more parts thereof, such as one or more body parts of a human being, e.g. a user, and/or an animal.

As used herein, the term "light", generally, refers to a partition of electromagnetic radiation which is, usually, referred to as "optical spectral range" and which comprises one or more of the visible spectral range, the ultraviolet spectral range and the infrared spectral range. Herein, the term "ultraviolet spectral range", generally, refers to electromagnetic radiation having a wavelength of 1 nm to 380 nm, preferably of 100 nm to 380 nm. Further, in partial accordance with standard ISO-21348 in a valid version at the date of this document, the term "visible spectral range", generally, refers to a spectral range of 380 nm to 760 nm. The term "infrared spectral range" (IR) generally refers to electromagnetic radiation of 760 nm to 1000 µm, wherein the range of 760 nm to 1.5 µm is usually denominated as "near infrared spectral range" (NIR) while the range from 1.5µ to 15 µm is denoted as "mid infrared spectral range" (MidIR) and the range from 15 µm to 1000 µm as "far infrared spectral range" (FIR). Preferably, light used for the typical purposes of the present invention is light in the infrared (IR) spectral range, more preferred, in the near infrared (NIR) and the mid infrared spectral range (MidIR), especially the light having a wavelength of 1 µm to 5 µm, preferably of 1 µm to 3 µm.

Light emerging from the object can originate in the object itself, but can also optionally have a different origin and propagate from this origin to the object and subsequently toward the spectrometer device. The latter case can, in particular, be affected by at least one illumination source being used. Thus, the light propagating from the object to the spectrometer device may be light which may be reflected by the object and/or a reflection device connected to the object. Alternatively or in addition, the light may at least partially transmit through the object.

The illumination source can be embodied in various ways. Thus, the illumination source can be for example part of the spectrometer device in a housing. Alternatively or additionally, however, the at least one illumination source can also be arranged outside a housing, for example as a separate light source. The illumination source can be arranged separately from the object and illuminate the object from a distance. As indicated above, the illumination source can, alternatively or in addition, also be connected to the object or be part of the object, such that, by way of example, the electromagnetic radiation emerging from the object can also be generated directly by the illumination source. By way of example, at least one illumination source can be arranged on and/or in the object and directly generate the electromagnetic radiation.

The illumination source may, preferably, comprise a kind of illumination source which may be known to provide sufficient emission in the infrared (IR) spectral range, especially, in the near infrared (NIR) spectral range, in particular, an incandescent lamp. Alternatively or in addition, the illumination source may, be selected from at least one of the following illumination sources: a flame source; a heat source; a laser, in particular a laser diode, although further types of lasers can also be used; a light emitting diode; an organic light source, in particular an organic light emitting diode; a neon light; a structured light source. Alternatively or additionally, other illumination sources can be used. Herein, it may particularly be preferred when the light emitted by the object and/or by the illumination source may exhibit a spectral range which may be closely related to the spectral sensitivities of the detector array, particularly, in a manner to ensure that the detector array which may be illuminated by the respective illumination source may be capable of providing a detector signal having a high intensity, thus, enabling an evaluation of the detector signals with sufficient signal-to-noise-ratio and, concurrently, a high-resolution.

As generally used, the term "spectrum" refers to a partition of the optical spectral range, in particular, of the infrared (IR) spectral range, especially of the near-infrared (NIR) spectral range. Herein, each part of the spectrum is constituted by an optical signal which is defined by a signal wavelength and the corresponding signal intensity. Further, the term "spectrometer device" relates to an apparatus which is capable of recording the signal intensity with respect to the corresponding wavelength of a spectrum or a partition thereof, such as a wavelength interval, wherein the signal intensity may, preferably, be provided as an electrical signal which may be used for further evaluation. In the spectrometer device according to the present invention, a length variable filter is used for separating incident light into a spectrum of constituent wavelength signals whose respective intensities are determined by employing a detector array as described below in more detail. In addition, an optical element which is designed for receiving incident light from the object and transferring the incident light to the length variable filter is applied. As further used herein, a "spectrometer system" may, thus, refer to an apparatus which, in addition to the spectrometer device, comprises an evaluation unit which is designated for determining information related to a spectrum of an object by evaluating detector signals provided by the spectrometer device as disclosed herein.

Thus, according to the present invention, the spectrometer device comprises a length variable filter which is designated for separating the incident light into a spectrum of constituent wavelength signals. As generally used, the term "length variable filter" refers to an optical filter which comprises a plurality of filters, preferably a plurality of interference filters, which may, in particular, be provided in a continuous arrangement of the filters. Herein, each of the filters may form a bandpass with a variable center wavelength for each spatial position on the filter, preferably continuously, along a single dimension, which is, usually, denoted by the term "length", on a receiving surface of the length variable filter. In a preferred example, the variable center wavelength may be a linear function of the spatial position on the filter, in which case the length variable filter is usually referred to as a "linearly variable filter" or by its abbreviation "LVF". However, other kinds of functions may be applicable to the relationship between the variable center wavelength and the spatial position on the filter. Herein, the filters may be located on a transparent substrate which may, in particular, comprise at least one material that may show a high degree of optical transparency within in the infrared (IR) spectral range, especially, within the near-infrared (NIR) spectral range as described below in more detail, whereby varying spectral properties, especially continuously varying spectral properties, of the filter along length of the filter may be achieved. In particular, the length variable filter may be a wedge filter that may be adapted to carry at least one response coating on a transparent substrate, wherein the response coating may exhibit a spatially variable property, in particular, a spatially variable thickness. However, other kinds of length variable filters which may comprise other materials or which may exhibit a further spatially variable property may also be feasible. At a normal angle of incidence of an incident light beam, each of the filters as comprised by the length variable filter may have a bandpass width that may amount to a fraction of the center wavelength, typically to a few percent, of the particular filter. By way of example, for a length variable filter having a wavelength range from 1400 to 1700 nm and a bandpass width of 1%, the bandpass width at the normal incidence angle might vary from 14 nm to 17 nm. However, other examples may also be feasible.

As a result of this particular set-up of the length variable filter, only incident light having a wavelength which may, within a tolerance indicated by the bandpass width, equal the center wavelength being assigned to a particular spatial position on the filter is able to pass through the length variable filter at the particular spatial position. Thus, a "transmitting wavelength" which may be equal to the center wavelength±½ of the bandpass width may be defined for each spatial position on the length variable filter. In other words, all light which may not pass through the length variable filter at the transmitting wavelength may be absorbed or, mostly, reflected by the receiving surface of the length variable filter. As a result, the length variable filter has a varying transmittance which may enable it for separating the incident light into a spectrum.

Thus, the light which may pass through the length variable filter at a particular spatial position on the length variable filter may, subsequently, impinge on a detector array. In other words, the detector array may, preferably, be placed in a manner that the light may first impinge on the length variable filter and only that the partition of the light which may pass through the particular spatial position on the length variable filter may, thereafter, be capable of impinging on a corresponding spatial position on the detector array. As a result, the length variable filter may, therefore, be used for separating the incident light by its associated wavelength or wavelengths into at least one corresponding spatial position while a particular optical sensor comprised by the detector array may, consequently, be employed for measuring an intensity of the incident light which, due to its particular wavelength, may be able to pass through the length variable filter at the corresponding spatial position and, therefore, impinge the particular optical sensors provided for determining the intensity of the incident light at the particular wavelength. In a particularly preferred embodiment, the detector array may, thus, comprise a sequence of optical sensor which may be located in form of a series of optical sensors one following the other, wherein the sequence of the optical sensors may be placed in a parallel manner with respect to the continuous arrangement of the interference filters along the length of the length variable filter.

In further preferred embodiment, the detector array may, preferably, be separated from the length variable filter by a transparent gap. Herein, the transparent gap may, by way of example, be obtained by using an extended transparent body having two opposing sides, wherein the plurality of the interference filters which may constitute the length variable filter may be disposed on a first side while the series of the optical sensors constituting the detector array may be placed on a second side opposing the first side. As a result, by selecting a suitable width for the transparent gap a more precise adjustment of the detector array with regard to the length variable filter can be achieved.

The detector array may, thus, comprise a series of optical sensors which may, preferably, be arranged in a single line as a one-dimensional matrix along the length of the length variable filter or in more than one line, especially as two, three, or four lines parallel lines, in form of a two-dimensional matrix, in particular, in order to receive most of the intensity of the incident light as possible. Thus, a number N of pixels in one direction may be higher compared to a number M of pixels in a further direction such that the one-dimensional 1×N matrix or a rectangular two-dimensional M×N matrix may be obtained, wherein M<10 and N≥10, preferably N≥20, more preferred N≥50. In addition, the matrixes used herein may also be placed in a staggered arrangement. Herein, each of the optical sensors as used therein may have the same or, within a tolerance level, a similar optical sensitivity, especially for ease of manufacturing the series of the optical sensors. Alternatively, each of the optical sensors as used in the series of the optical sensors may exhibit a varying optical sensitivity that may vary in accordance with the varying transmittance properties of the length variable filter, such as by providing an increasing variation or a decreasing variation of the optical sensitivity with wavelength along the series of the optical sensors. However, other kinds of arrangements may also be feasible.

In particular, in order to achieve a high resolution of the spectrometer device, each of the optical sensors may, thus, be adapted to receive incident light only over a small spatial angle. This arrangement, particularly, reflects the setup of the length variable filter which is designed to generate the desired spectrum depending on the spatial position of the impingement of the incident light along the length of the filter. This particular arrangement is, according to the present invention, achieved by a detector array which, thus, comprises a plurality of pixelated sensors, wherein each of the pixelated sensors is adapted to receive at least a portion of one of the constituent wavelength signals as provided by the length variable filter. As indicated above, each of the constituent wavelength signals is, hereby, related to an intensity of each of the constituent wavelengths. As generally used, the terms "pixelated optical sensor" or, simply, "pixelated sensor" refers to an optical sensor which comprises an array of individual pixel sensors, wherein each of the individual pixel sensors has at least a photosensitive area which is adapted for generating an electrical signal depending on the intensity of the incident light, wherein the electrical signal may, in particular, be provided to an external evaluation unit for further evaluation. Herein, the photosensitive area as comprised by each of the individual pixel sensors may, especially, be a single, uniform photosensitive area which is configured for receiving the incident light which impinges on the individual pixel sensor. However, other arrangements of the pixelated sensors may also be conceivable.

The pixelated sensor is designed to generate signals, preferably electronic signals, associated with the intensity of the incident light which impinges on the individual pixelated sensor. The signal may be an analogue and/or a digital signal. The electronic signals for adjacent pixelated sensors can, accordingly, be generated simultaneously or else in a temporally successive manner. By way of example, during a row scan or line scan, it is possible to generate a sequence of electronic signals which correspond to the series of the individual pixel sensors which are arranged in a line. In addition, the individual pixel sensors may, preferably, be active pixel sensors which may be adapted to amplify the electronic signals prior to providing it to the external evaluation unit. For this purpose, the pixelated sensor may comprise one or more signal processing devices, such as one or more filters and/or analogue-digital-converters for processing and/or preprocessing the electronic signals.

The pixelated sensor may be selected from any known pixel sensor, in particular, from a pixelated organic camera element, preferably, a pixelated organic camera chip, or from a pixelated inorganic camera element, preferably, a pixelated inorganic camera chip, more preferably from a CCD chip or a CMOS chip, which are, commonly, used in various cameras nowadays. As an alternative, the pixelated sensor may be or comprise a photoconductor, in particular an inorganic photoconductor, especially PbS, PbSe, Ge, InGaAs, ext. InGaAs, InSb, or HgCdTe. As a further alternative it may comprise of pyroelectric, bolometer or thermopile detector elements. Thus, a camera chip having a matrix of 1×N pixels or of M×N pixels may be used here, wherein M<10 and N≥10, preferably N≥20, more preferred N≥50. Further, a mono-chrome camera element, preferably a monochrome camera chip, may be used, wherein the monochrome camera element may be differently selected for each pixel sensor, especially, in accordance with the varying wavelength along the series of the optical sensors.

As a further alternative, the pixelated sensor may be based on a FiP sensor which is, among further documents, disclosed in WO 2012/110924 A1, WO 2014/097181 A1, or WO 2016/120392 A1. Herein, the term "FiP sensor" refers to a sensor in which the sensor signal, given the same total power of the illumination, is, according to the so called "FiP effect", dependent on a geometry of the illumination of the photosensitive area, in particular on a beam cross-section of the illumination on the photosensitive area, also denoted as a "spot size". As a result, the observable property that an electrical property of the photosensitive area depends on an extent of the illumination of the photosensitive area by incident light particularly accomplishes that two incident light beams comprising the same total power but generating different spot sizes on the photosensitive area provide different values for the electrical property of the photosensitive area and are, thus, distinguishable with respect to each other. Preferably, the photosensitive area of each of the FiP sensors may comprise a photoconductive material, especially selected from PbS, PbSe, or HgCdTe, or a solid dye sensitized solar cell (sDSC). Further, WO 2014/198625 A1 discloses a particular embodiment of a detector array which employs a M×N matrix of FiP sensors. Alternatively, further kinds of pixelated sensors may also be feasible.

Thus, the detector array may be adapted to provide a plurality of the electrical signals which may be generated by the photosensitive areas of the pixelated sensors comprised by the detector array. The electrical signals as provided by the detector array of the spectrometer device may, subsequently, be forwarded to an external evaluation unit, in particular, to an evaluation unit which may be comprised by a corresponding spectrometer system as described below in more detail. Herein, the term "evaluation unit" refers to an apparatus being designated for determining information related to the spectrum of the object of which a spectrum has been recorded, in particular, by using the spectrometer device as described herein, wherein the information is obtainable by evaluating the detector signals as provided by the detector array of the spectrometer device. The information may, for example, be provided electronically, visually, acoustically or in any arbitrary combination thereof. Further, the information may be stored in a data storage device of the spectrometer device, preferably of the spectrometer system, or of a separate storage device and/or may be provided via at least one interface, such as a wireless interface and/or a wire-bound interface.

According to the present invention, the spectrometer device further comprises an optical element which is designated for receiving incident light from the object and, simultaneously, transferring the incident light to the length variable filter, wherein the optical element is arranged in a manner that the captured light is transferred to the length variable filter along a light path which is asymmetric with respect to an optical axis of the spectrometer device. As used herein, the term "optical axis" refers to an imaginary line of symmetry along which other elements of the spectrometer device apart from optical element, in particular, the length variable filter and the detector array, may be invariant with regard to a reflection or a rotation of the symmetric optical elements comprised by the spectrometer system. Transferring the captured light to the length variable filter may, thus, be achieved by using the at least one optical element, wherein at least one property of the optical element, in particular, at least one of a shape of the optical element or an arrangement of the optical element with respect to the optical axis of the spectrometer device, may result in a light path which may exhibit an asymmetric course with respect to the optical axis of the spectrometer device.

With regard to a body or at least one element thereof, the terms "symmetric" or "symmetrical" refer, as generally used, to a geometric property of the body having a shape or at least one element thereof that may be invariant to an application of at least one operation usually denoted as "geometric transformation" which may, in particular, include a reflection, a rotation, a translation and/or a combination thereof. In the present case, however, the preferred geometric transformations may be the reflection and the rotation. In particular, the body or the element thereof can be considered to have reflectional symmetry with respect to an axis and/or to a mirror plane if the axis and/or the mirror plane, respectively, can divide the shape of the body or the element thereof into two partitions which assume mirror images of each other. By way of example, the body may be considered as symmetric in an event in which it comprises the two identical mirror segments which are arranged in a manner with respect to an axis of reflection that they can be considered as mirror images of each other. Similarly, the body can be considered to have a rotational symmetry with respect to at least one fixed point and/or a mirror plane comprising the axis of rotation of the body or the element thereof if it can be rotated about the fixed point or the mirror plane, respectively, in a manner that the shape of the body or the element thereof may not change thereby. In contrast hereto, the terms "asymmetric" or "asymmetrical" may denote that at least one of the geometric properties of the body under consideration may not be invariant to at least one of the geometric transformations which may be applicable to this body.

More particular, one of the following symmetry groups may be applicable to the optical element. As generally used, the term "symmetry group" describes a particular symmetry of the body or the element thereof by indicating which kind of geometric transformations may be applicable to the body or the element thereof. For this consideration, a particular symmetry group may, especially, be denoted by using the so-called "Schoenfliess notation". Herein, the following terms which are defined as follows may, preferably, be applicable to the shape of the body of the element thereof:

C∞ which refers to the symmetry of a truncated cone, wherein the shape of the truncated cone is preserved under a rotation about an arbitrary angle with respect to a mirror plane comprising the axis of rotation of the truncated cone;

C4v which refers to a square pyramid trunk, wherein the shape of the square pyramid trunk is only preserved under a rotation about an angle of 360°/4=90° with respect to a mirror plane comprising the axis of rotation of the square pyramid trunk;

C2v which refers to a rectangular pyramid trunk apart from a square pyramid trunk, wherein the shape of the rectangular pyramid trunk is only preserved under a rotation about an angle of 360°/2=180° with respect to a mirror plane comprising the axis of rotation of the rectangular pyramid trunk;

Cs which refers to a reflectional symmetry only, wherein the shape of the body or the element thereof is only preserved by a reflection on a mirror plane;

C2 which refers to a two-fold symmetry only, wherein the shape of the body or the element thereof may only be preserved under a rotation about an angle of 360°/2=180° with respect to a particular axis of rotation of the body or the element thereof; or C1 which refers to an absence of any symmetry elements.

For further information about the Schoenflies-Notation, reference may, for example, be made to Morton Hamermesh, Group *Theory and its application to physical problems*, Dover Publications, Mineola, N.Y. 1989, Chapter 2, *Symmetry Groups*, pages 32-67.

With particular respect to the present invention, the optical element may, thus, being denoted as having an asymmetric shape in an event in which the shape of the optical element may exhibit less symmetric elements as described by the symmetry group C2v according to the Schoenfliess notation, in particular, having at least one of the symmetry groups Cs, C2, or C1. In this regard, it may, however, be emphasized that for the consideration of the symmetry of the optical element only those partitions of the optical element may be relevant which may affect the beam path of the incident light, especially, the optically guiding structure which is located between the input and the output of the optical element. In particular, other shapes of the optical element, such as an exterior shape, may, thus, be left out of consideration. In addition, for determining the symmetry of the optical element, manufacturing tolerances are taken into account.

Similarly, a light path within an optical device, in particular within a spectrometer device, may be denoted by one of the terms "symmetric" or "symmetrical" in an event in which a course of the light path follows the optical axis of the optical device in a manner that the course of the light path may be invariant to an application of a reflection with respect to the optical axis of the spectrometer device as a geometric transformation. In particular, the course of the light path can be considered to have reflectional symmetry with respect to the optical axis of the spectrometer device if the optical axis can reflect the course of the light path in a manner that it may assume a mirror image thereof. In contrast hereto, the terms "asymmetric" or "asymmetrical" may denote that the course of the light path may not be invariant to at least one reflection with respect to the optical axis of the spectrometer device which may be applicable to the course of the light path.

Thus, the light path of the captured light which is transferred from the object via the at least one optical element to the length variable filter assumes an asymmetric course with respect to the optical axis of the spectrometer device. Preferably, the asymmetric course of the light path may be achieved by using at least one optical element having at least one asymmetric property, in particular, an optical element having an asymmetric shape, especially an optical element exhibiting less symmetric elements as described above by the symmetry group C2v according to the Schoenfliess notation, in particular, having at least one of the symmetry groups Cs, C2, or C1; and/or an optical element which is asymmetrically arranged with regard to the optical axis of the spectrometer device, wherein the shape of the optical element may be one of a symmetric shape or an asymmetric shape.

In various preferred embodiments, the at least one optical element may be selected from the group comprising:

a transfer element having an asymmetric property; or
a baffle filter having an asymmetric property; or
an optical concentrator device operated in reverse direction having an asymmetric property.

Hereby, the symmetry of the optical arrangement according to the present invention is broken, whereby, surprisingly, less light may be discarded and more light may be guided through the optical element via the length variable filter onto the detector array.

In a preferred embodiment, the optical element may, thus, be or comprise a transfer element, wherein the transfer element may comprise a single lens or a compound lens having at least two single lenses which are, usually, arranged along a common axis. As generally used, the term "lens" refers to a transmissive optical device which is adapted to focus or to disperse a light beam by using refraction. In accordance with the present invention, the transfer element may have an asymmetric property, wherein the asymmetric property of the transfer element may be selected from at least one of an asymmetric lens shape, an asymmetric compound lens, or an asymmetric arrangement of a single lens or a compound lens with respect to the optical axis of the spectrometer device. In a particularly preferred embodiment, a tilted lens may be used for generating a tilted light cone, wherein all incoming light beams may be arranged in a manner that they may be at maximum orthogonal to a plane of the detector array or, as an alternative, directed towards a spatial position on the length variable filter which may be adapted for receiving the longer wavelengths.

In a further preferred embodiment, the optical element may, thus, be or comprise a baffle filter having an asymmetric property. As generally known, the term "baffle filter" refers to a device which may be used to restrain a spreading of light in a particular direction, particularly, in order to minimize stray light. Thus, the baffle filter may, especially, be adapted in order to allow only light beams to pass which are perpendicular to a surface of the baffle filter, thus, enabling parallel light beams to impinge the length variable filter located after the baffle filter in beam direction within the spectrometer device. This effect may be achieved by providing a number of planar baffle plates which are arranged in a parallel manner with respect to each other. Using symmetric baffle filters may, therefore, be able to overcome a major design limitation of the length variable filter which is its dependence of the filter's transmission wavelength on the incident angle of the incoming light beam with an effect that the incident light may, thus, be restricted to a very narrow light beam, resulting in low light throughput and a poor signal-to-noise ratio of the spectrometer.

However, as indicated above, breaking the symmetry of the optical arrangement according to the present invention, surprisingly, allows discarding less light and bringing more light through the length variable filter onto the detector array. For this purpose, a baffle filter having an asymmetric property is used. Herein, the asymmetric property of the baffle filter may be selected from at least one of an asymmetric shape of the baffle filter or an asymmetric arrangement of the baffle filter with respect to the optical axis of the spectrometer system. In particular, the asymmetric arrangement of the baffle filter may be achieved by using a tilted baffle arrangement, such as the tilted baffle as exemplarily described in the embodiments below. Further, the asymmetric shape of the baffle filter may be obtained by using selectively coated partitions on one side of the surfaces of the baffle plates, whereby the desired symmetry break can be achieved. Again, a preferred example of the asymmetrically shaped baffle filter is described in the embodiments below.

In a further preferred embodiment, the optical element may comprise an optical concentrator device which is operated in reverse direction having an asymmetric property. As generally used, the term "optical concentrator" refers to a non-imaging optical element having an input, also denoted as "entrance pupil" or "entrance aperture", an output located oppositely to the input, wherein the output may also be denoted by the term "exit pupil" or "exit aperture", and an optically guiding structure located between the input and the output, wherein the optical concentrator is, in normal direction of operation, adapted for capturing light at the input at a large angular spread, concentrating the captured light within the optically guiding structure, and emitting the concentrated light at the output. By way of example, the optical concentrator may, therefore, be used in concentrated photovoltaics in order to allow high solar concentration under large possible entrance angles.

In contrast hereto, the optical concentrator device is used in reverse direction, in which the previous output of the optical concentrator now serves as input for receiving incident light, while the optically guiding structure in the reverse direction, preferably, serves for spreading out the incident light, whereas the previous input now serves as output for emitting the spread light. In a preferred embodiment of the present invention the entrance pupil of the inversely-operated optical concentrator device, preferably, comprises an input angle of less than 90°, more preferably of less than 70°, in particular of less than 50°. Further in this preferred embodiment, the exit pupil of the inversely-operated optical concentrator device, preferably, comprises an output angle of not more than 30°, more preferably of not more than 15°, in particular of not more than 10°. Hereby, an angular spread of emitted light beams at the output can, simultaneously, be reduced compared to the incident light. As a result, applying the optical concentrator device in reverse direction allows capturing incident light which is emitted or reflected by the object or passes through the object in a manner that light which is emitted at the output of the inversely-operated optical concentrator device exhibits a diminished angular spread, wherein the diminished angular spread may, preferably, be restricted to an angular range of at most ±20°, preferably of at most ±10°, most preferred of at most ±5°.

Consequently, the optical concentrator device operated in reverse direction may, thus, be selected and arranged in a fashion that the emitted light beams can impinge on the length variable filter within the restricted angular range and, thus, predominantly in a direction normal to the receiving surface of the length variable filter, i.e. in a perpendicular manner with respect to the receiving surface of the length variable filter. As already indicated above, each of the interference filters as comprised by the length variable filter may, at such a normal angle of light incidence, have a bandpass width which may only amount to a fraction of the center wavelength of the particular interference filter. As a result, incident light may enter the length variable filter with considerably higher concentration efficiency.

As mentioned above, various shapes of optical concentrator devices which are operated in normal direction have been presented before. Herein, the optical concentrator device can have a conical shape or a shape in a fashion that they may be referred to as a "compound parabolic concentrator" or "CPC" or a "compound elliptical concentrator" or "CEC" while further shapes, in particular a "compound hyperbolic concentrator" or "CHC", may be less suited for the purposes of the present invention. Herein, as generally used, the conical optical concentrator may be defined by two plane mirror segments which open with respect to each other in a linear manner. Further, the compound parabolic concentrator may be defined by two parabolic mirror segments which may comprise two different focal points each lying on one of the parabolic mirror segments. Hereby, surfaces of the two parabolic mirror segments may be arranged in a symmetrical manner with respect to reflection through an axis of the compound parabolic concentrator. Similarly, the compound elliptical concentrator may, thus, be defined by two elliptical mirror segments, wherein surfaces of the two elliptical mirror segments may be arranged in a symmetrical manner with respect to reflection through an axis of the compound elliptical concentrator.

Thus, the optical concentrator device which is operated in reverse direction, more particular the optically guiding structure which is located between the input and the output of the optical element, may comprise a conical shape or, preferably, a non-conical shape. Herein, the optical concentrator device having the conical shape may more easily be manufactured. However, as a result of the non-conical shape, the light beams may be guided through the concentrator in a manner that the efficiency at the output of the inversely operated optical concentrator device is increased. This effect is, especially, based on the non-conical shape of the inversely-operated optical concentrator device which allows, in particular contrast to a conically-shaped inversely-operated optical concentrator device, to guide the incident light in form of light beams through the non-conically shaped inversely-operated optical concentrator device in a manner that less light may be absorbed by sidewalls of the inversely-operated optical concentrator device. As a result more, light beams can reach the length variable filter at the spatial position on the length variable filter which is configured for receiving the light beam with the particular wavelength as comprised by the light beam. In addition, a transfer function of the non-conical shape shows a steeper onset of light transmission with respect to an entrance angle into the inversely-operated optical concentrator device, thereby exhibiting a theoretical maximum of a completely binary transition from no light transmission to full light transmission for a compound parabolic concentrator. Such a kind of steepness of the transfer function may, thus, be advantageous in minimizing an area of spectroscopic sampling for a given light throughput, thereby providing a clear definition for the sampling spot and supporting in homogenizing a response from the sampling spot.

More particular, the term "conical" with regard to an optical element according to the state of the art refers to a shape of the optical element which can be described by the symmetry group C2v or higher according to the Schoenfliess notation, such as C2v, C4v, or C∞, in particular a truncated cone or a pyramidal trunk, wherein, as indicated above, manufacturing tolerances are, however, taken into account. In contrast hereto, the term "non-conical" with regard to the optical element according to the present invention refers to a shape of the optical element which can be described by a symmetry group less than C2v according to the Schoenfliess notation, such as Cs, C2, or C1 as indicated above, wherein, again, manufacturing tolerances are, however, taken into account. In other words, the optically guiding structure which is located between the input and the output of the optical element according to the present invention may, preferably, comprise a shape that may exhibit a diameter at a half distance between the input and the output of the optical element which may, for a conical shape, correspond to an arithmetic mean of a first diameter of the input of the optical element and a second diameter of the output of the optical element whereas it may deviate from the arithmetic mean of the first diameter and the second diameter by at least 10%, preferably at least 5%, mostly preferred at least 2%, especially at least 1%, for the non-conical shape.

In a particular embodiment, the non-conical shape of the optical concentrator device which is operated in reverse direction may, thus, preferably be selected from a parabolic shape or an elliptical shape. Consequently, the optical concentrator device may, especially, be selected from the group comprising a compound parabolic concentrator and a compound elliptical concentrator. However, other kinds of optical concentrator devices having a non-conical shape may also be feasible.

In particular, the parabolic shape of the optical element, especially of the optically guiding structure which is located between the input and the output of the optical element, may, leaving aside manufacturing tolerances, be described by Equation (1) as follows:

$$y = y_0 + ax^2, \quad (1)$$

wherein the term x refers to a value along the optical axis of the optical element, in particular, of the optically guiding structure of the inversely-operated optical concentrator device, whereas the term y refers to a value perpendicular to the optical axis, wherein the terms $y_0$ and $a$ provide opportunities for adjusting the parabolic shape with respect of the optical element.

Similarly, the elliptic shape of the optical element, especially of the optically guiding structure which is located between the input and the output of the optical element, may, leaving aside manufacturing tolerances, be described by Equation (2) as follows:

$$y = \pm \frac{a}{b}\sqrt{a^2 - x^2}, \quad (2)$$

wherein the term x refers to a value along the optical axis of the optical element, in particular, of the optically guiding structure of the inversely-operated optical concentrator device, whereas the term y refers to a value perpendicular to the optical axis, wherein the terms a and b which refer to semi axis of the elliptical shape, again, provide opportunities for adjusting the parabolic shape with respect of the optical element.

The inversely-operated optical concentrator device may be or may comprise a full body of a fully or partially optically transparent material or, as an alternative, may be or may comprise a hollow body which can be, preferably fully and/or uniformly, filled with a gaseous and/or fluid and/or solid optically transparent material and which comprises at least two individual sidewalls that may assume the desired conical or non-conical shape. Herein, the at least one material that may show a high degree of optical transparency within in the infrared (IR) spectral range, especially, within the near-infrared (NIR) and mid-infrared (MidIR) spectral range, and which can be chosen for the full body of the optical concentrator device may, preferably, be selected from the group consisting of calcium fluoride ($CaF_2$,), fused silica, germanium, magnesium fluoride (MgF), potassium bromide (KBr), sapphire, silicon, sodium chloride (NaCl), zinc selenide (ZnSe), zinc sulfide (ZnS), borosilicate-crown glasses, transparent conducting oxides (TCO), and transparent organic polymers, wherein silicon and germanium having high reflective indices are particularly preferred since they are capable of supporting total reflection which may occur on the sidewalls of the full body. As an alternative, the gaseous optically transparent material which may be chosen for filling the hollow body having at least two sidewalls showing the desired conical or non-conical shape may be selected from ambient air, nitrogen gas, or carbon dioxide while the fluid optically transparent material for this purpose may be chosen from immersion oil or Canada balsam, i.e. a turpentine made from the resin of a balsam fir tree, especially from *Abies balsamea*. As a further alternative, a vacuum may be present in the hollow body.

In a further preferred embodiment, the efficiency of the spectrometer device can, further, be increased by applying an inversely-operated optical concentrator device which comprises at least two individual sidewalls which are adapted for reflecting incident light, the sidewalls of the optical concentrator device being located on opposing lateral positions with respect to a longitudinal axis of the optical concentrator device. In addition to the two opposing individual sidewalls, the optical concentrator device may further comprise a base plate and a cover plate such that a closed shape may be provided for the optical concentrator device which may, thus, assume a quasi two-dimensional appearance. As a result, the shape of the optical concentrator device may comprise at least four corner lines at lines of intersection between any one of the sidewalls and one of the base plate or the cover plate of the optical concentrator device. However, further corner lines may be conceivable. This embodiment is in particular contrast to known inversely-operated optical concentrator devices which uses non-reflective, absorbable surfaces in order to avoid under all possible circumstances that light beams may reach the length variable filter at a spatial position on the length variable filter which may not be configured for receiving the light beam having the particular wavelength as comprised by the light beam. In contrast hereto, as a result of this further preferred embodiment, the inversely-operated optical concentrator device may allow some light beams to be reflected and, still, be guided to the length variable filter.

In a further preferred embodiment, the efficiency of the spectrometer device can, even further, be increased by applying an inversely operated optical concentrator device which comprises the at least two individual sidewalls that are designed as rounded sidewalls, wherein at least one of the rounded sidewalls may, advantageously, comprise a profile which may be selected from a parabolic profile or an elliptical profile. Herein, the profile refers to a form of a cross section of the sidewall at the lateral positions of the optical concentrator device which may, in particular, be or comprise a parabolic shape or an elliptical shape, respectively. As indicated above, the inversely-operated optical concentrator device may be or comprise a full body having the desired conical or non-conical form. In this event, at least one of the sidewalls may, preferably assume a profile which may, preferably, be arranged in a manner that it may protrude from the surface of the optical concentrator device. In the alternative as further indicated above, the inversely-operated optical concentrator device may be or comprise a hollow body having the at least two sidewalls that assume the desired conical or non-conical form, wherein, in this alternative, at least one of the sidewalls may assume a profile which may, preferably, be arranged in a manner that it may intrude into the surface of the hollow body. As a result of this further preferred embodiment, the particular shape of the sidewalls of the inversely-operated optical concentrator device may, in addition, ensure that that more light beams are guided in a manner that they can reach the length variable filter at the desired spatial position on the length variable filter, whereby the efficiency of the spectrometer device as described herein can, further, be increased.

Thus, in particular contrast to US 2014/131578 A1, the optical element is arranged in a manner that the captured light is transferred to the length variable filter along a light path which is asymmetric with regard to a common optical axis of the spectrometer device. As already defined above, the term "optical axis" refers to an imaginary line along which the setup of the spectrometer device, in particular the inversely-operated optical concentrator device, the length variable filter and the detector array, may be invariant with regard to a rotation of the symmetric optical elements comprised by the spectrometer system. As a result, the combination of the optical element, the length variable filter, the detector array and, optionally, further optical elements of the spectrometer device, may, thus, exhibit a symmetry break which can be described in a similar manner as above, especially, by using a corresponding Schoenfliess notation. For this purpose, the Schoenfliess notation, in particular, offers the symmetry group C4v which refers to an arrangement in which a rotation about an angle of 360°/4=90° with respect to a mirror plane comprising the axis of rotation is preserved. Breaking this kind of symmetry may, thus, result in a preferred arrangement according to the present invention. However, other kinds of asymmetric arrangements as result of further symmetry breaks of the respective arrangement of the optical element, the length variable filter, the detector array and, optionally, further optical elements within the spectrometer device may also be feasible. As a result of the asymmetric arrangement of the inversely-operated optical concentrator device and the setup of the length variable filter as described elsewhere in more detail, an asymmetric response of the spectrometer device can be expected with respect to the wavelength range of the detector array.

Since the optical element may be arranged in an asymmetric manner with respect to the optical axis of the spectrometer device, the response of the spectrometer device can no longer be expected to be equal for small wavelengths detectable on one side of the detector array and for long wavelengths detectable on the opposing side of the detector array. However, this observation may exhibit particular advantages for the spectrometer device, in particular, when an incandescent lamp may be used as the illumination source. As generally used, the term "incandescent lamp" refers to an electric light having a heatable element, such as a wire filament heated, which may be heated to a temperature that it may emit light, especially infrared light. Since the incandescent lamp can, therefore, be considered as a thermal emitter within the infrared spectral range, an emission power of the incandescent lamp decreases with increasing wavelength. In addition, known materials which may, typically, be used for absorption within the infrared spectral range, generally, exhibit a tendency of increased absorption with increasing wavelength. Further, as already indicated above, since the bandpass width of the length variable filter, in particular of the linearly variable filter, which may, typically, assume a constant value, such as 1%, over the spectral range of the length variable filter, the resolution of the length variable filter, which is inversely proportional to the bandpass width, also decreases with increasing wavelength. Further, the resolution of the length variable filter, in general, depends on the center wavelength of the length variable filter. Combining all mentioned effects, it appears that in a symmetric spectrometer device the response of the spectrometer device decreases with increasing wavelength.

However, in accordance with a further preferred embodiment of the present invention using the optical element being arranged in an asymmetric manner with respect to the optical axis of the spectrometer device may allow adjusting a length of a path that a light beam may travel from the entry into the optical element through the optical element to the exit of the optical element. As a result, an asymmetry of the arrangement of the optical element may allow to provide a shorter path for a light beam having a longer wavelength compared to a light beam having a shorter wavelength and, additionally or as an alternative, the light beam to impinge the length variable filter closer to normal incidence, whereby the efficiency may, further be increased. As a result, the further preferred embodiment may facilitate providing a spectrometer device which may, especially, be adapted for allowing a higher efficiency at longer wavelengths. Further, although it may appear that the efficiency at shorter wavelengths may, therefore, be diminished, in particular, due to a longer path for a light beam having a shorter wavelength compared to a light beam having a longer wavelength, this effect may, in this kind of arrangement, generally be outweighed by the above-indicated higher emission power of the incandescent lamp and the lower bandpass width at shorter wavelengths. Thus, this kind of arrangement can be used for equipping the spectrometer device with an efficiency which may be more equally distributed over the wavelength range of the spectrometer device according to the present invention compared to known spectrometer devices, especially in the infrared spectral range.

In this further preferred embodiment of the asymmetric arrangement according to the present invention, the optical element may, therefore, be tilted with respect to a plane which is perpendicular to a receiving surface of the length variable filter as described above. As generally used, the term "tilted" refers to an inclination of a symmetry axis of the optical element with respect to the plane normal to the receiving surface of the length variable filter in a perpendicular manner. As a result of the tilted arrangement of the optical element, the entrance axis and the exit pupil axis of the optical element may be one of: shifted and parallel with respect to each other, shifted but not parallel with respect to each other, or not shifted and not parallel with respect to each other. More preferred, the optical element may be tilted with respect to this plane which is normal to the receiving surface of the length variable filter in a manner that the light beams may impinge the length variable filter normal to the receiving surface of the length variable filter on a spatial position on the length variable filter being designated for receiving a particular wavelength of the incident light. As an alternative, the optical element may be tilted with respect to this plane in a further manner that further light beams may impinge a further spatial position on the length variable filter being designated for receiving a further particular wavelength, wherein the further particular wavelength exceeds the wavelength of the incident light beam, i.e. exhibits a longer wavelength than the incident light which may be directed to impinge the surface of the length variable filter.

Therefore, the incident light beam may pass the length variable filter at a longer wavelength compared to its inherent wavelength but due to the relative arrangement between the length variable filter and the detector array, which may be separated by a gap as described elsewhere in this document in more detail, the incident light beam may, still, impinge the particular optical sensor which is provided for determining the intensity of the incident light at the particular wavelength of the incident light beam. As a result, not only light beams which impinge the length variable filter normal to the receiving surface of the length variable filter on a spatial position on the length variable filter being designated for this purpose but also light beams which impinge the length variable filter on a further spatial position being designated for receiving a longer wavelength than the wavelength of the incident light beam but, still, impinge the particular optical sensor designed for receiving the particular wavelength of the incident light beam, may contribute to the electrical signals being generated by the photosensitive area of the particular individual pixel sensor. Consequently, the efficiency of the spectrometer device can, in this manner, even further be increased.

In addition, the spectrometer device according to the present invention may, further, comprise at least one transfer device, which can, in particular, be arranged between the optical element and the length variable filter. Most preferably, the light beam which emerges from the object may, therefore, travel firstly through the optical element and, thereafter, at or through the transfer device until it may, subsequently, pass the length variable filter until it may, finally, impinge the detector array. As used herein, the term "transfer device" may, thus, refer to an optical component which can be configured to transfer the light beam emerging from the optical element to the detector array. In a particular embodiment, the transfer device can, thus, be designed to shape the light beam before it may be guided to the length variable filter.

Particularly, the transfer device may be selected from a group consisting of an optical lens, a curved mirror, a grating, and a diffractive optical element. More particular, the optical lens may, especially, be selected from a group consisting of a biconvex lens, a plano-convex lens, a biconcave lens, a plano-concave lens, an aspherical lens, a cylindrical lens and a meniscus lens. Hereby, the transfer device may comprise a material which may be at least partially transparent, preferably over the whole wavelength range of the length variable filter as indicated above. For this purpose, the same or similar optically transparent materials as mentioned in this respect can also be used. However, further optical elements may also be feasible.

In a further aspect of the present invention, a spectrometer system is disclosed. Accordingly, the spectrometer system comprises a spectrometer device as described above and/or below in more detail; and an evaluation unit designated for determining information related to a spectrum of an object by evaluating detector signals provided by the spectrometer device.

Herein, the components of the spectrometer system as listed above may be individual components. Alternatively, two or more of the components of the spectrometer system may be integrated into a single integral component. Further, the evaluation unit may be formed as an individual evaluation unit independent from the spectrometer device but may preferably be connected to the detector array, in particular, in order to receive the detector signals as generated by the spectrometer device. Alternatively, the at least one evaluation unit may fully or partially be integrated into the at least one spectrometer device.

According to the present invention, the spectrometer system comprises a spectrometer device and an evaluation unit. With respect to the spectrometer device, reference may be made to the description elsewhere in this document. As further used herein, the term "evaluation unit", generally, refers to an arbitrary device designed to generate the desired items of information, i.e. the at least one item of information related to the spectrum of the object. As an example, the evaluation unit may be or may comprise one or more integrated circuits, such as one or more application-specific integrated circuits (ASICs), and/or one or more data processing devices, such as one or more of computers, digital signal processors (DSP), field programmable gate arrays (FPGA) preferably one or more microcomputers and/or microcontrollers. Additional components may be comprised, such as one or more preprocessing devices and/or data acquisition devices, such as one or more devices for receiving and/or preprocessing of the detector signals, such as one or more AD-converters and/or one or more filters. As used herein, the detector signal is provided by the spectrometer device, in particular, by the detector array of the spectrometer device. Further, the evaluation unit may comprise one or more data storage devices. Further, the evaluation unit may comprise one or more interfaces, such as one or more wireless interfaces and/or one or more wire-bound interfaces.

The at least one evaluation unit may be adapted to perform at least one computer program, such as at least one computer program performing or supporting the step of generating the items of information. As an example, one or more algorithms may be implemented which, by using the sensor signals as input variables, may perform a predetermined transformation into the position of the object. For this purpose, the evaluation unit may, particularly, comprise at least one data processing device, in particular an electronic data processing device, which can be designed to generate the items of information by evaluating the detector signals. Thus, the evaluation unit is designed to use the detector signals as input variables and to generate the items of information related to the spectrum of the object by processing these input variables. The processing can be done in parallel, subsequently or even in a combined manner. The evaluation unit may use an arbitrary process for generating these items of information, such as by calculation and/or using at least one stored and/or known relationship. Besides the detector signals, one or a plurality of further parameters and/or items of information can influence said relationship, for example at least one item of information about a relative arrangement of the optical element, the length variable filter, and the detector array as comprised by the spectrometer device. The relationship can be determined or determinable empirically, analytically or else semi-empirically. Particularly preferably, the relationship comprises at least one calibration curve, at least one set of calibration curves, at least one function or a combination of the possibilities mentioned. One or a plurality of calibration curves can be stored for example in the form of a set of values and the associated function values thereof, for example in a data storage device and/or a table. Alternatively or additionally, however, the at least one calibration curve can also be stored for example in parameterized form and/or as a functional equation. Separate relationships for processing the detector signals into the items of information may be used. Alternatively, at least one combined relationship for processing the detector signals is feasible. Various possibilities are conceivable and can also be combined.

By way of example, the evaluation unit can be designed in terms of programming for the purpose of determining the items of information. The evaluation unit can comprise, in particular, at least one computer, for example at least one microcomputer. Furthermore, the evaluation unit can comprise one or a plurality of volatile or nonvolatile data memories. As an alternative or in addition to a data processing device, in particular at least one computer, the evaluation unit can comprise one or a plurality of further electronic components which are designed for determining the items of information, for example an electronic table and in particular at least one look-up table and/or at least one application-specific integrated circuit (ASIC).

Further, the evaluation unit can also be designed to completely or partially control or drive the spectrometer device or a part thereof, for example by the evaluation unit being designed to control at least one illumination source and/or to control the optical element of the spectrometer and/or to control at least one modulation device of the detector. The evaluation unit can, in particular, be designed to carry out at least one measurement cycle in which a plurality of detector signals are picked up, especially, the detector signals of successively arranged individual pixelated sensors along the length of the detector array and/or at different modulation frequencies of the illumination. Herein, acquiring the detector signals can be performed sequentially, in particular, by using a row scan and/or line scan. However, other embodiments are also possible, for example, embodiments in which especially selected individual pixel sensors are recorded simultaneously.

In a particular embodiment, the detector can have, thus, at least one modulation device for modulating the illumination, preferably for a periodic modulation, especially a periodic beam interrupting device. As generally used, a modulation of the illumination comprises a process in which a total power of the illumination is varied, preferably periodically, in particular with one or a plurality of modulation frequencies. In particular, a periodic modulation can be effected between a maximum value and a minimum value of the total power of the illumination. The minimum value can be 0, but can also be >0, such that, by way of example, complete modulation does not have to be effected. The modulation can be effected for example in a beam path between the object and the detector array, such as by the modulation device being arranged in said beam path. Alternatively or additionally, however, the modulation can also be effected in a beam path between an optional illumination source for illuminating the object and the object, for example by the modulation device being arranged in said beam path. A combination of these possibilities is also conceivable. By way of example, the modulation device can comprise a beam chopper or some other type of periodic beam interrupting device, for example comprising at least one interrupter blade or interrupter wheel, which preferably rotates at constant speed and which can thus periodically interrupt the illumination. Alternatively or additionally, however, it is also possible to use one or a plurality of different types of modulation devices, for example modulation devices based on an electro-optical effect and/or an acousto-optical effect. Once again alternatively or additionally, the optional illumination source itself can also be designed to generate a modulated illumination, for example by said illumination source itself having a modulated intensity and/or total power, for example a periodically modulated total power, and/or by said illumination source being embodied as a pulsed illumination source, for example as a pulsed laser. Thus, by way of example, the modulation device can also be wholly or partly integrated into the illumination source. Various possibilities are conceivable. Accordingly, the detector array can be designed to detect at least two detector signals in the case of different modulations having different modulation frequencies. The evaluation device can be designed to generate the information related to the spectrum from two or more detector signals. By way of example, the detector can be designed to bring about a modulation of the illumination of the object with a frequency of 0.05 Hz to 1 MHz, such as 0.1 Hz to 10 kHz.

In a further aspect of the present invention, a use of a spectrometer device and a spectrometer system according to the present invention is disclosed. Therein, the use of the spectrometer device and the spectrometer system for a purpose of determining information related to a spectrum of an object is proposed. Herein, the spectrometer device and the spectrometer system may, preferably, be used for a purpose of use selected from the group consisting of: an infrared detection application; a heat-detection application; a thermometer application; a heat-seeking application; a flame-detection application; a fire-detection application; a smoke-detection application; a temperature sensing application; and a spectroscopy application. Further the spectrometer device and the spectrometer system according to the present invention can, preferably, be used to monitor exhaust gas, to monitor combustion processes, to monitor pollution, to monitor industrial processes, to monitor chemical processes, to monitor food processing processes, to assess water quality, and/or to assess air quality. Further, spectrometer devices and spectrometer systems according to the present invention may be used for quality control, temperature control, motion control, exhaust control, gas sensing, gas analytics, motion sensing, and/or chemical sensing. Further applications are feasible.

The above-described spectrometer device, the spectrometer system and the proposed uses have considerable advantages over the prior art. Thus, generally, a simple and, still, efficient spectrometer device and a spectrometer system for an accurate determining of information related to a spectrum of an object may be provided. Therein, as an example, an infrared spectrum of an object covering a partition of the infrared spectral range can be acquired in a fast and efficient way. As compared to devices known in the art, the spectrometer device and the spectrometer system as proposed herein provide a high degree of simplicity, specifically with regard to an optical setup of the spectrometer device. Herein, an asymmetric shape and/or arrangement of the optical element, the length variable filter, and the detector array as comprised by the spectrometer device may be advantageous for capturing incident light from the object and transferring the incident light to a length variable filter with a higher concentration efficiency as currently available. This high degree of simplicity, in combination with the possibility of high resolution measurements, is specifically suited for sensing, detecting and/or monitoring applications in the infrared (IR) spectral region, especially in the near-infrared (NIR) and mid-infrared (MidIR) spectral region, in particular, for sensing or detecting heat, flames, fire, or smoke, as well as monitoring exhaust gas, combustion processes, pollutions, industrial processes, chemical process, food processing processes, water quality, or air quality. Further applications are possible.

Summarizing, in the context of the present invention, the following embodiments are regarded as particularly preferred:

Embodiment 1: A spectrometer device, comprising:
an optical element designed for receiving incident light from an object and transferring the incident light to a length variable filter, wherein the optical element is arranged in a manner that the incident light is transferred to the length variable filter along a light path which is asymmetric with respect to an optical axis of the spectrometer device;
the length variable filter which is designated for separating the incident light into a spectrum of constituent wavelength signals; and
a detector array comprising a plurality of pixelated sensors, wherein each of the pixelated sensors is adapted to receive at least a portion of one of the constituent wavelength signals, wherein each of the constituent wavelength signals is related to an intensity of each constituent wavelength.

Embodiment 2: The spectrometer device according to the preceding embodiment, wherein the optical element is selected from at least one of an optical concentrator device operated in reverse direction, a transfer element, or a baffle filter, wherein the optical element exhibits an asymmetric shape or is arranged in an asymmetric manner with respect to the optical axis of the spectrometer device.

Embodiment 3: The spectrometer device according to the preceding embodiment, wherein the optical concentrator device is operated in reverse direction for spreading out the incident light and, simultaneously, reducing an angular spread of light beams.

Embodiment 4: The spectrometer device according to any one of the two preceding embodiments, wherein the optical concentrator device comprises a conical shape or a non-conical shape.

Embodiment 5: The spectrometer device according to the preceding embodiment, wherein the non-conical shape of the optical concentrator device comprises a shape selected from a parabolic shape or an elliptical shape.

Embodiment 6: The spectrometer device according to the preceding embodiment, wherein the optical concentrator device is selected from the group comprising a compound parabolic concentrator and a compound elliptical concentrator.

Embodiment 7: The spectrometer device according to any one of the five preceding embodiments, wherein the optical concentrator device has an asymmetric design with respect to an optical axis of the spectrometer device.

Embodiment 8: The spectrometer device according to the preceding embodiment, wherein the optical concentrator device operated in reverse direction comprises an entrance pupil and an exit pupil, wherein an entrance plane defined by the entrance pupil and an exit plane defined by the exit pupil are not parallel.

Embodiment 9: The spectrometer device according to any one of the two preceding embodiments, wherein the concentrator device comprises inversion symmetry and only a two-fold rotational axis.

Embodiment 10: The spectrometer device according to any one of the three preceding embodiments, wherein the concentrator device does not exhibit a rotational symmetry.

Embodiment 11: The spectrometer device according to any one of the four preceding embodiments, wherein the concentrator device comprises only a single mirror plane or no mirror plane.

Embodiment 12: The spectrometer device according to any one of the ten preceding embodiments, wherein the optical concentrator device is arranged in an asymmetric manner with respect to an optical axis of the spectrometer device.

Embodiment 13: The spectrometer device according to the preceding embodiment, wherein the non-conical shape of the optical concentrator device is arranged in an asymmetric manner with respect to the length variable filter.

Embodiment 14: The spectrometer device according to the preceding embodiment, wherein the respective arrangement of the optical concentrator device operated in reverse direction and the length variable filter comprises only a single mirror plane or no mirror plane.

Embodiment 15: The spectrometer device according to any one of the two preceding embodiments, wherein respective arrangement of the optical concentrator device operated in reverse direction and the length variable filter does not exhibit a rotational symmetry.

Embodiment 16: The spectrometer device according to any one of the three preceding embodiments, wherein the optical concentrator device is tilted with respect to a plane which is perpendicular to a receiving surface of the length variable filter.

Embodiment 17: The spectrometer device according to the preceding embodiment, wherein the optical concentrator device is tilted with respect to the plane perpendicular to a receiving surface of the length variable filter in a manner that the incident light which is transferred to the length variable filter impinges the length variable filter perpendicular to the receiving surface of the length variable filter on a spatial position of the length variable filter which is designed for receiving a wavelength of the incident light and/or impinges a further spatial position on the length variable filter which is designed for receiving a further wavelength which exceeds the wavelength of the incident light.

Embodiment 18: The spectrometer device according to any one of the sixteen preceding embodiments, wherein the optical concentrator device is or comprises a full body of an optically transparent material.

Embodiment 19: The spectrometer device according to the preceding embodiment, wherein the optically transparent material is selected from the group consisting of calcium fluoride ($CaF_2$,), fused silica, germanium, magnesium fluoride (MgF), potassium bromide (KBr), sapphire, silicon, sodium chloride (NaCl), zinc selenide (ZnSe), zinc sulfide (ZnS), borosilicate-crown glasses, transparent conducting oxides (TOO), and transparent organic polymers.

Embodiment 20: The spectrometer device according to any one of the eighteen preceding embodiments, wherein the optical concentrator device is or comprises a hollow body.

Embodiment 21: The spectrometer device according to any one the preceding embodiment, wherein a vacuum is present in the hollow body.

Embodiment 22: The spectrometer device according to the pre-preceding embodiment, wherein the hollow body is filled with a gaseous and/or fluid optically transparent material.

Embodiment 23: The spectrometer device according to the preceding embodiment, wherein the hollow body is fully and/or uniformly filled with the gaseous and/or fluid optically transparent material.

Embodiment 24: The spectrometer device according to any one of the two preceding embodiments, wherein the gaseous optically transparent material is selected from ambient air, nitrogen gas or carbon dioxide.

Embodiment 25: The spectrometer device according to any one of the three preceding embodiments, wherein the fluid optically transparent material is selected from immersion oil or Canada balsam.

Embodiment 26: The spectrometer device according to any one of the twenty-four preceding embodiments, wherein the optical concentrator device has at least two individual sidewalls.

Embodiment 27: The spectrometer device according to the preceding embodiment, wherein the sidewalls are adapted for reflecting incident light.

Embodiment 28: The spectrometer device according to any one of the two preceding embodiments, wherein the optical concentrator device further comprises a base plate and a cover plate being adapted for providing a closed shape for the optical concentrator device, Embodiment 29: The spectrometer device according to the preceding embodiment, wherein the closed shape comprises at least four corner lines at lines of intersection between any one of the sidewalls and one of the base plate or the cover plate of the optical concentrator device.

Embodiment 30: The spectrometer device according to any one of the four preceding embodiment, wherein at least one of the sidewalls of the optical concentrator device is designed as rounded sidewalls.

Embodiment 31: The spectrometer device according to the preceding embodiment, wherein at least one of the rounded sidewalls of the optical concentrator device comprises a profile selected from a parabolic profile or an elliptical profile.

Embodiment 32: The spectrometer device according to any one of the two preceding embodiment, wherein at least one of the sidewalls assumes a profile which protrudes from the surface of the optical concentrator device being or comprising a full body of an optically transparent material or wherein at least one of the sidewalls assumes a profile which intrudes into the surface of the hollow body of the optical concentrator device.

Embodiment 33: The spectrometer device according to any one of the twenty-nine preceding embodiments, wherein the transfer element comprises a single lens or a compound lens having at least two single lenses, wherein the transfer element exhibits an asymmetric property.

Embodiment 34: The spectrometer device according to the preceding embodiment, wherein the asymmetric property of the transfer element is selected from at least one of an asymmetric lens shape, an asymmetric compound lens, or an asymmetric arrangement of the single lens or of the compound lens with respect to an optical axis of the spectrometer device.

Embodiment 35: The spectrometer device according to any one of the twenty-nine preceding embodiments, wherein the single lens is a refractive lens having a symmetric shape, wherein the refractive lens is tilted by an angle $\alpha$ with respect to the optical axis of the spectrometer device.

Embodiment 36: The spectrometer device according to any one of the thirty-two preceding embodiments, wherein the asymmetric property of the baffle filter is selected from at least one of an asymmetric shape of the baffle filter or an asymmetric arrangement of the baffle filter with respect to the optical axis of the spectrometer system.

Embodiment 37: The spectrometer device according to the preceding embodiment, wherein the asymmetric arrangement of the baffle filter comprises a tilted arrangement of the baffle filter with respect to the optical axis of the spectrometer system.

Embodiment 38: The spectrometer device according to any one of the two preceding embodiments, wherein the asymmetric arrangement of the baffle filter comprises a baffle filter comprising selectively coated partitions on a surface of baffle planes, wherein the baffle filter is constituted by a number of baffle planes which are located in a parallel arrangement with respect to each other.

Embodiment 39: The spectrometer device according to any one of the preceding embodiments, wherein the detector array is separated from the length variable filter by a transparent gap.

Embodiment 40: The spectrometer device according to the preceding embodiment, wherein the transparent gap is obtainable by an extended transparent body having two opposing sides, wherein a plurality of interference filters which constitute the length variable filter are disposed on a first side while a series of the pixelated sensors constituting the detector array is placed on a second side opposing the first side.

Embodiment 41: The spectrometer device according to any one of the preceding embodiments, wherein the pixelated sensor is selected from at least one of: a pixelated organic camera element, preferably a pixelated organic camera chip; a photoconductor array, in particular an inorganic photoconductor array, especially a PbS, PbSe, Ge, InGaAs, ext. InGaAs, InSb, or HgCdTe photoconductor array; a pyroelectric, bolometer or thermopile array; a pixelated inorganic camera element, preferably a pixelated inorganic camera chip, more preferably from a CCD chip or a CMOS chip; a monochrome camera element, preferably a monochrome camera chip; a FiP sensor.

Embodiment 42: The spectrometer device according to any one of the preceding embodiments, wherein the incident light comprises electromagnetic radiation of 760 nm to 1000 µm (infrared spectral range).

Embodiment 43: The spectrometer device according to the preceding embodiment, wherein, wherein the incident light comprises electromagnetic radiation of 1 µm to 5 µm.

Embodiment 44: The spectrometer device according to the preceding embodiment, wherein, wherein the incident light comprises electromagnetic radiation of 1 µm to 3 µm.

Embodiment 45: The spectrometer device according to any one of the preceding embodiments, further comprising an illumination source adapted for illuminating the object.

Embodiment 46: The spectrometer device according to the preceding embodiment, wherein the illumination source is integrated or attached to the spectrometer device.

Embodiment 47: The spectrometer device according to any one of the two preceding embodiments, wherein the illumination source is selected from: an illumination source, which is at least partly connected to the object and/or is at least partly identical to the object; an illumination source which is designed to at least partly illuminate the object with a primary radiation.

Embodiment 48: The detector according to the preceding embodiment, wherein the light beam is generated by a reflection of the primary radiation on the object and/or by light emission by the object itself, stimulated by the primary radiation.

Embodiment 49: The detector according to the preceding embodiment, wherein the spectral sensitivities of the detector array are covered by a spectral range of the illumination source.

Embodiment 50: The spectrometer device according to any one of the four preceding embodiments, wherein the illumination source is selected from at least one of: an incandescent lamp; a flame source; a heat source; a laser, in particular a laser diode; a light emitting diode; an organic light source, in particular an organic light emitting diode; a neon light; a structured light source.

Embodiment 51: The spectrometer device according to any one of the preceding embodiments, further comprising a transfer device.

Embodiment 52: The spectrometer device according to the preceding embodiment, wherein the transfer device constitutes or comprises a converging optical element, wherein the converging element is at least partially optically transparent with respect to at least a partition of a wavelength range of the incident light.

Embodiment 53: The spectrometer device according to the preceding embodiment, wherein the converging optical element is selected from a group consisting of a converging optical lens, converging diffractive optical element and a converging curved mirror.

Embodiment 54: The spectrometer device according to any one of the three preceding embodiments, wherein the transfer device is located between the optical concentrator device and the length variable filter.

Embodiment 55: A spectrometer system, comprising
a spectrometer device according to any one of the preceding embodiments; and
an evaluation unit designated for determining information related to a spectrum of an object by evaluating detector signals provided by the spectrometer device.

Embodiment 56: The spectrometer system according to the preceding embodiment, wherein the evaluation device is designed to generate the information related to the spectrum of the object from at least one predefined relationship between the location of the pixelated sensor in the detector array, the wavelength of the incident light, and the signal of the pixelated sensor.

Embodiment 57: The spectrometer system according to the preceding embodiment, wherein the detector signal is generated by performing at least one current-voltage measurement and/or at least one voltage-current-measurement.

Embodiment 58: The spectrometer system according to any one of the preceding embodiments related to the spectrometer system, further comprising an illumination source adapted for illuminating the object.

Embodiment 59: The spectrometer system according to the preceding embodiment, wherein the illumination source is selected from at least one of: an incandescent lamp; a flame source; a heat source; a laser, in particular a laser diode; a light emitting diode; an organic light source, in particular an organic light emitting diode; a neon light; a structured light source.

Embodiment 60: A use of a spectrometer device or a spectrometer system according to any one of the preceding embodiments in an infrared detection application; a heat-detection application; a thermometer application; a heat-seeking application; a flame-detection application; a fire-detection application; a smoke-detection application; a temperature sensing application; a spectroscopy application; an exhaust gas monitoring application; a combustion process monitoring application; a pollution monitoring application; an industrial process monitoring application; a chemical process monitoring application; a food processing process monitoring application; a water quality monitoring application; an air quality monitoring application; a quality control application; a temperature control application; a motion control application; an exhaust control application; a gas sensing application; a gas analytics application; a motion sensing application; a chemical sensing application.

BRIEF DESCRIPTION OF THE FIGURES

Further optional details and features of the invention are evident from the description of preferred exemplary embodiments which follows in conjunction with the dependent claims. In this context, the particular features may be implemented alone or with features in combination. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

EXEMPLARY EMBODIMENTS

Figure 1:
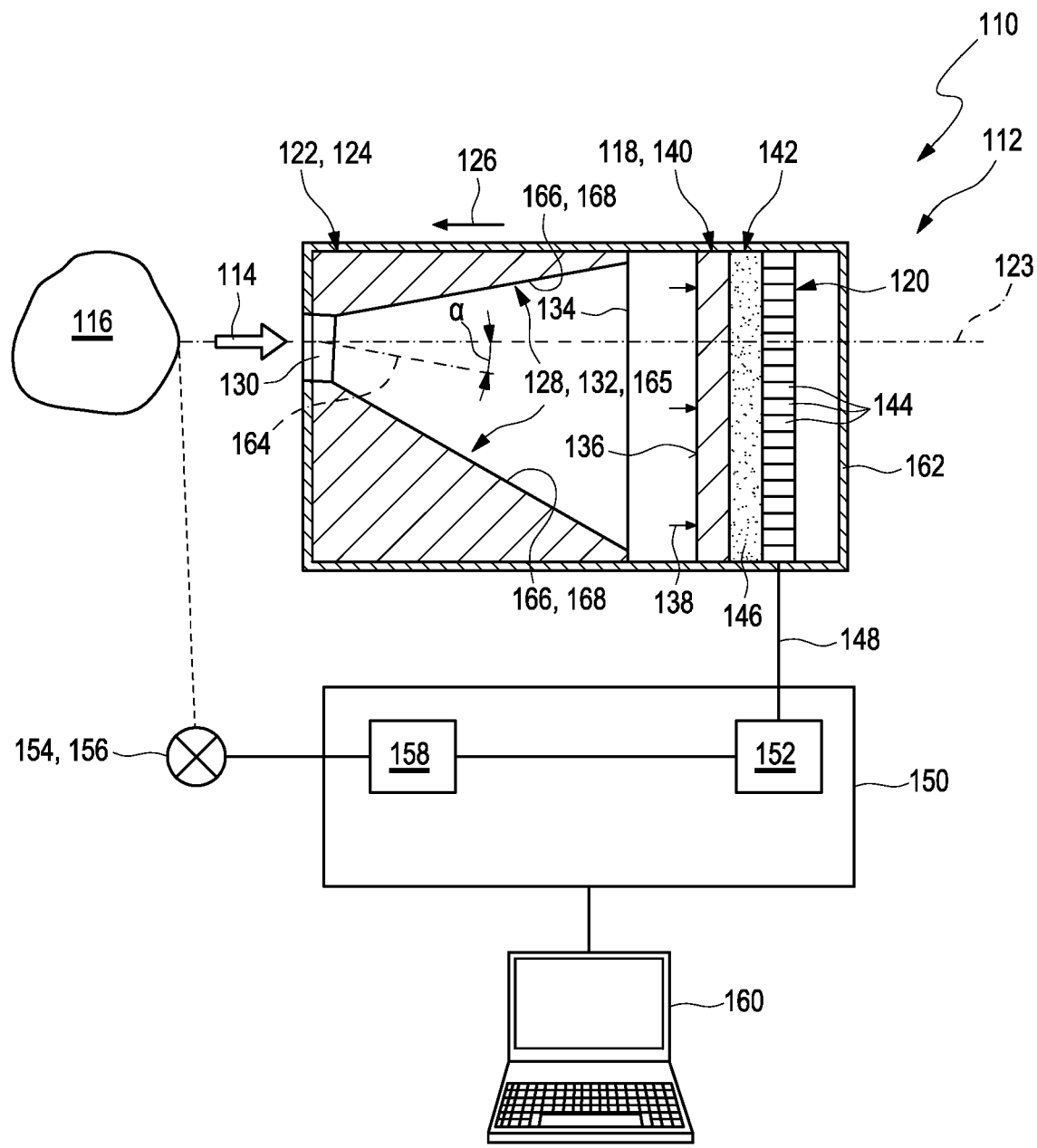
FIGS. 1A and 1B show a schematic view of an exemplary embodiment of a spectrometer system comprising a spectrometer device according to the present invention (FIG. 1 A) and advantages of the asymmetric arrangement of the optical concentrator device (FIG. 1B), respectively.
Figure 1:
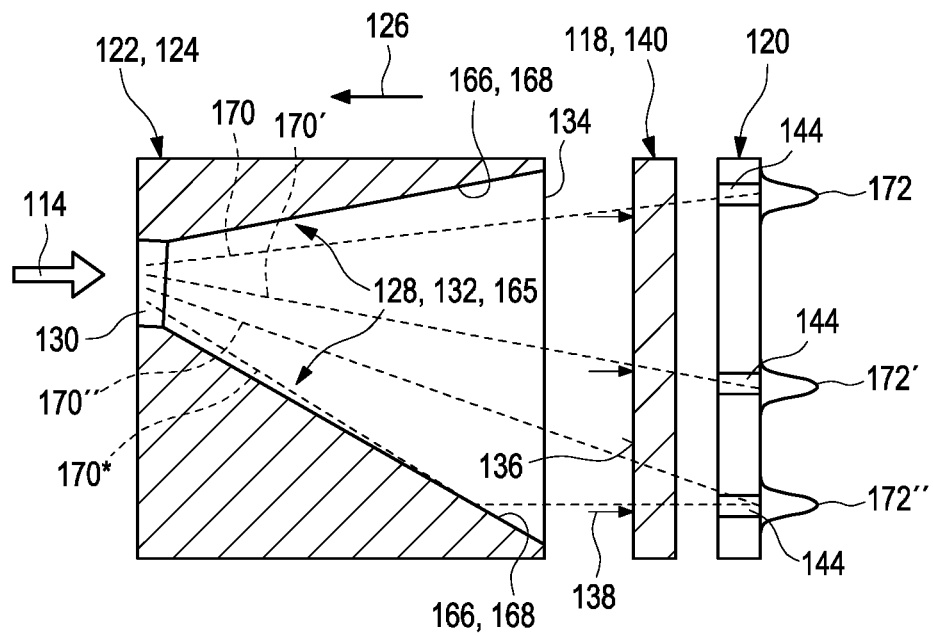

FIG. 1A illustrates, in a highly schematic fashion, an exemplary embodiment of a spectrometer system 110 which comprises a spectrometer device 112 according to the present invention. As generally used, the spectrometer device 112 is an apparatus which is capable of recording a signal intensity of incident light 114 with respect to a corresponding wavelength or a wavelength interval of the incident light 114 over a range of wavelength which is denoted as a spectrum or a partition thereof. According to the present invention, the spectrometer device 112 may, especially, be adapted for recording a spectrum in the infrared (IR) spectral region, preferably, in the near-infrared (NIR) and the mid-infrared (MidIR) spectral range, especially, wherein the incident light may have a wavelength of 1 µm to 5 µm, preferably of 1 µm to 3 µm, and can, thus, be applicable for a detection of heat, flames, fire, or smoke, wherein further applications may be feasible. Herein, the incident light 114 may be generated and/or reflected by an object 116, which may be a living object and a non-living object, such as comprising one or more articles and/or one or more parts of an article, wherein the at least one article or the at least one part thereof may comprise at least one component which can provide a spectrum which may be suitable for investigations in the IR, especially in the NIR spectral region.

The exemplary spectrometer device 112 as schematically depicted in FIG. 1A comprises a linearly variable filter 118 as a preferred example of a length variable filter. Herein, the linearly variable filter 118 is designated for separating the incident light 114 into a spectrum of constituent wavelength signals, a detector array 120 which is designed for determining respective intensities of received wavelength signals, and an optical element 122 which is designated for receiving incident light 114 from the object 116 and transferring the incident light 114 to the linearly variable filter 118.

According to the present invention, the optical element 122 is arranged in a manner that the incident light 114 is transferred to the linearly variable filter 118 along a light path which is asymmetric with respect to an optical axis 123 of the spectrometer device 112. In the preferred exemplary embodiment of FIG. 1A, the optical element 122 comprises an optical concentrator device 124, wherein the optical concentrator device is operated in reverse direction 126, wherein the inversely-operated optical concentrator device 124 comprises a conical shape 128. Herein, the inversely-operated optical concentrator device 124 comprises an input 130, an optically guiding structure 132 and an output 134. Consequently, the incident light 114 which may be emitted or reflected by the object 116 or may have passed through the object 116 enters the inversely-operated optical concentrator device 124 at the input 130 which is designed for receiving the incident light 114. Thereafter, the incident light 114 captured by the input 130 passes through the optically guiding structure 132 which is, preferably, designed for spreading out the incident light 114. Finally, the incident light 114 which has been spread out in this manner is emitted by the output 134 which is being designated for this purpose.

Consequently, a predominant share of the light beams provided by the output 134 of the inversely-operated optical concentrator device 124 impinges the linearly variable filter 118 in a parallel manner, especially, normal to a receiving surface 136 of the linearly variable filter 118 in a perpendicular manner. As used in this exemplary embodiment, the linearly variable filter 118 is or comprises an optical filter having a plurality of interference filters which are, preferably, provided in a continuous arrangement of interference filters. Herein, each of the interference filters may form a bandpass with a variable center wavelength for each spatial position 138 on the receiving surface 136 of the linearly variable filter 118 in a manner that the variable center wavelength may be a linear function of the spatial position 138. As exemplary shown in FIG. 1A, the linearly variable filter 118 may, thus, be arranged, preferably continuously, along a single dimension, usually as "length" of the linearly variable filter 118. By way of example, the linearly variable filter 118 may be a wedge filter that may carry at least one response coating 140 on a transparent substrate 142, wherein the response coating 140 may exhibit a spatially variable property, in particular, a spatially variable thickness (not depicted here). Herein, the transparent substrate 142 may comprise at least one material that may exhibit a high degree of optical transparency in the IR spectral range which can, preferably, be selected from the group consisting of calcium fluoride ($CaF_2$,), fused silica, germanium, magnesium fluoride (MgF), potassium bromide (KBr), sapphire, silicon, sodium chloride (NaCl), zinc selenide (ZnSe), zinc sulfide (ZnS), borosilicate-crown glasses, transparent conducting oxides (TOO), and transparent organic polymers, wherein $CaF_2$, fused silica, MgF, KBr, sapphire, NaCl, ZnSe, ZnS, borosilicate-crown glasses, transparent conducting oxides, and selected transparent organic polymers may, especially, be applicable for the NIR spectral range. However, other embodiments of the linearly variable filter 118 may also be feasible. However, other kinds of length variable filters may also be feasible for the purposes of the present invention.

The linearly variable filter 118 is designated for separating the incident light 114 into a spectrum of constituent wavelength signals. For this purpose, the incident light 114 may, preferably, pass through the linearly variable filter 118 at the particular spatial position 138 which is related to the wavelength of the incident light 114. After the incident light 114 has passed through the linearly variable filter 118 at the particular spatial position 138 related to the wavelength of the incident light 114, it, subsequently, impinges the detector array 120, in particular one of a plurality of pixelated sensors 144 as comprised by the detector array 120. Thus, each of the pixelated sensors 144 receives at least a portion of one of the constituent wavelength signals as provided by the incident light 114 after having passed through the linearly variable filter 118 as described above. Moreover, each of the pixelated sensors 144 is adapted to provide a detector signal which is related to an intensity of each constituent wavelength. In other words: The spectrometer device 112 is, thus, designated to generate a plurality of detector signals based on the constituent wavelength signals, wherein each of the detector signals is related to the intensity of each constituent wavelength of the spectrum.

As further indicated in FIG. 1A, the detector array 120 may, preferably, be separated from the linearly variable filter 118 by a transparent gap 146, wherein the transparent gap 146 may, by way of example, be obtained by using the transparent substrate 142. As a result, by selecting a suitable width for the transparent gap 146 a more precise adjustment of the detector array 120 with regard to the linearly variable filter 118 can be achieved. As indicated below in more detail, adjusting the transparent gap 146 may allow further increasing the efficiency of the spectrometer device 112.

The plurality of detector signals may, as schematically depicted in FIG. 1A, via a signal lead 148 be transmitted to an evaluation unit 150, which may be comprised by the spectrometer system 110 in addition to the spectrometer device 110. Herein, the evaluation unit 150 is, generally, designated for determining information related to a spectrum of the object 116 by evaluating the plurality of detector signals as provided by the detector array 120 of the spectrometer device 112. For this purpose, the evaluation unit 150 may comprise one or more electronic devices and/or one or more software components, in order to evaluate the plurality of the detector signals, which are symbolically denoted by a signal evaluation unit 152. Herein, the evaluation unit 150 may be adapted to determine the at least one item of information related to a spectrum of the object 116 by comparing more than one of the detector signals.

The incident light 114 which is received by the optical element 122 of the spectrometer device 112 may be generated by a light-emitting object 116. Alternatively or in addition, the incident light 114 may be generated by a separate illumination source 154, which may include an ambient light source and/or an artificial light source, in particular an incandescent lamp 156, which may be designated for illuminating the object 116 in a manner that at least a part of the light generated by the illumination source 154 may be able to pass through the object 116 (not depicted here) and/or in a manner that the object 116 may be able to reflect at least a part of the light generated by the illumination source 154 such that the incident light 114 may be configured to be received by the optical element 122. Herein, the illumination source 154 may be or comprise a continuously emitting light source and/or a modulated light source. As further depicted in FIG. 1A, the illumination source 154 may be controlled by at least one illumination control unit 158 which may be adapted, if required, for providing modulated light. Herein, the illumination control unit 158 may, additionally, provide information about the illumination to the signal evaluation unit 152 and/or be controlled by the signal evaluation unit 152, which is symbolically indicated by a connection between the illumination control unit 158 and the signal evaluation unit 152 in FIG. 1A. Alternatively or in addition, controlling the illumination of the object 116 may be effected in a beam path between the illumination source 154 and the object 116 and/or between the object 116 and the optical element 122. Further possibilities may be conceivable.

Generally, the evaluation unit 150 may be part of a data processing device 160 and/or may comprise one or more data processing devices 160. The evaluation unit 150 may be fully or partially integrated into a housing 162 which at least comprises the spectrometer device 112 and/or may fully or partially be embodied as a separate device which may electrically be connected in a wireless or wire-bound fashion to the spectrometer device 112. Further, the optical element 122, the linearly variable filter 118, and the detector array 120 may, preferably, be located inside the housing 162 comprising at least the spectrometer device 112. The evaluation unit 150 may further comprise one or more additional components, such as one or more electronic hardware components and/or one or more software components, such as one or more measurement units and/or one or more evaluation units and/or one or more controlling units (not depicted here).

As further illustrated in the exemplary embodiment of FIG. 1A, the spectrometer device 112 comprises the optical element 122, the linearly variable filter 118, and the detector array 120, wherein the linearly variable filter 118 and the detector array 120 are arranged along the optical axis 123 of the spectrometer device 112 whereas the optical element 122 is arranged in an asymmetric manner with respect to the optical axis 123 such that the incident light 114 is transferred to the linearly variable filter 118 along a light path which is asymmetric to the optical axis 123. Specifically, the optical axis 123 may be an axis of symmetry and/or rotation of the setup of at least one of the linearly variable filter 118 and the detector array 120. Especially, the optical axis 123 may, thus, be parallel to a plane which is perpendicular to the receiving surface 136 of the linearly variable filter 118. Thus, a symmetry axis 164 of the optical element 122 may be tilted by an angle α with respect to the optical axis 123 of the spectrometer device 112 which is, preferably, parallel to the plane which is perpendicular to the receiving surface 136 of the linearly variable filter 118.

Herein, the inversely-operated optical concentrator device 124 may be provided in form of a full body (not depicted here) of a transparent optical material having a high optical transmittance in the IR spectral range in order to enhance a reflectivity of the optical concentrator device 124. In particular, the inversely-operated optical concentrator device 124 may be provided in form of the full body of an at least partially optically transparent material having a high degree of optical transparency in the IR spectral range which can, preferably, be selected from the group consisting of calcium fluoride ($CaF_2$,), fused silica, germanium, magnesium fluoride (MgF), potassium bromide (KBr), sapphire, silicon, sodium chloride (NaCl), zinc selenide (ZnSe), zinc sulfide (ZnS), borosilicate-crown glasses, transparent conducting oxides (TCO), and transparent organic polymers, wherein $CaF_2$, fused silica, MgF, KBr, sapphire, NaCl, ZnSe, ZnS, borosilicate-crown glasses, transparent conducting oxides, and selected transparent organic polymers may, especially, be applicable for the NIR spectral range, wherein silicon and germanium having high refractive indices are particularly preferred since they are capable of supporting total reflection which may occur on sidewalls of the full body.

However, as further illustrated in FIG. 1A, the inversely-operated optical concentrator device 124 may, as an alternative, be provided in form of a hollow body 165 having two opposing individual sidewalls 166 which may be arranged in a lateral manner with respect to a longitudinal axis of the optical concentrator device 124 that they constitute the desired conical shape 128. In addition to the two opposing individual sidewalls 166 being located in lateral positions, the optical concentrator device 124 may further comprise a base plate and a cover plate (not depicted here) in order to provide a closed shape for the optical concentrator device 124. As a result, the shape of the optical concentrator device 124 comprises at least four corner lines at lines of intersection between any one of the sidewalls 166 and one of the base plate or the cover plate of the optical concentrator device 124. For this purpose, the hollow body 165 having the base plate, the cover plate, and the two individual sidewalls 166 which show the desired conical shape 128 may comprise a vacuum or may, preferably fully and/or uniformly, be filled with a gaseous and/or fluid optically transparent material, especially selected from ambient air, nitrogen gas, carbon dioxide, immersion oil, or Canada balsam, in order to be applicable as the optical concentrator device 124 operated in the reverse direction 126.

In a further embodiment, at least one transfer device (not depicted here), in particular, a refractive lens, may, additionally, be placed between the optical element 122 and the linearly variable filter 118. However, since the optical element 122 is implemented in the particular embodiments of FIGS. 1, 2A and 2B in form of inversely-operated optical concentrator devices 124, the use of a transfer device, in particular, a refractive lens, appears to be dispensable because this implementation of the optical element 122 is capable of, concurrently, taking over the function of the transfer device, in particular, a refractive lens, especially with regard to providing a predominant share of parallel light beams which may impinge on the linearly variable filter 118 normal to the receiving surface 136 of the linearly variable filter 118 in a perpendicular manner.

In various embodiments, at least one of the sidewalls 166 of the hollow body 165 which constitutes the inversely-operated optical concentrator device 124 may be designed as sidewalls (not depicted here) which are adapted to absorb such wavelengths of the incident light 114 which may deviate to a high degree from a path which can, eventually, guide the incident light to impinge the linearly variable filter 118 in a predominantly parallel manner. However, such kinds of sidewalls of the hollow body 165 may, as indicated above, diminish the efficiency of the spectrometer device 112 since an absorptive share of the incident light 114 is deterred from passing the linearly variable filter 118 and, eventually, reaching the detector array 120 and can, thus, not contribute to the detector signal.

Therefore, in the particularly preferred embodiment as depicted in FIG. 1A, at least one of the sidewalls 166 of the hollow body 165 constituting the inversely-operated optical concentrator device 124 may be designated as reflective sidewalls 168 which may be adapted for reflecting incident light 114. As a result, the reflective sidewalls 168 may, thus, be capable of increasing the efficiency of the spectrometer device 112 by allowing additional light beams 170 as schematically depicted in FIG. 1B to be guided, by reflection on the reflective sidewalls 168, to the linearly variable filter 118 and, subsequently, to the detector array 120 where they, may, in addition, contribute to the detector signal. Consequently, providing reflective sidewalls 168 which may define the hollow body 165 which implements the inversely-operated optical concentrator device 124 can, thus, further increase the efficiency of the spectrometer device 112, in particular, by reducing the signal-to-noise ratio.

As schematically shown in the top view of FIG. 1B, the asymmetric arrangement of the optical element 122 within the spectrometer device 112 as depicted in FIG. 1A may provide additional advantages. As illustrated herein, each of three different light beams 170, 170', 170" having three different wavelengths may generate a detector signal 172, 172', 172" in the corresponding pixelated sensor 144 of the detector array 120 having, within a defined tolerance level, the same intensity irrespective of their wavelength. This advantage may even be achieved when using an incandescent lamp 156 as the illumination source 158 which can be considered as a thermal emitter within the IR spectral range and, therefore exhibits an emission power which decreases with increasing wavelength. However, this effect may be outweighed by the asymmetric arrangement of the optical element 122, wherein a longer path for the light beam 170 having the shorter wavelength compared to a light beam 170" having the longer wavelength may be provided.

In addition, further effects which may influence the intensity of the light beam 170, 170', 170" at the pixelated sensor 144 may be outweighed in this manner. Especially, known IR absorption materials exhibit a tendency of increased absorption with increasing wavelength. Further, since a bandpass width of the linearly variable filter 118 typically, assumes a constant value, such as 1%, over the spectral range of the linearly variable filter 118, the resolution of the linearly variable filter 118 being inversely proportional to the bandpass width, also decreases with increasing wavelength. Further, the resolution of the linearly variable filter 118, in general, depends on the center wavelength of the linearly variable filter. However, the asymmetric arrangement of the optical element 122 may facilitate the spectrometer device 112 to be more receptive for longer wavelengths while the higher emission power of the incandescent lamp 158 and the lower bandpass width at shorter wavelengths may result in an efficiency of the spectrometer device 112 being more equally distributed over its wavelength range.

The efficiency of the spectrometer device 112 can even further be increased when at least one of the sidewalls 166 of the inversely-operated optical concentrator device are reflective sidewalls 168. As schematically shown in FIG. 1B, the reflective sidewalls 168 may allow additional light beams 170* to be guided, by reflection on the reflective sidewalls 168, to the linearly variable filter 118 and, subsequently, to the detector array 120 where they, may, in addition, contribute to the detector signal. However, the exemplary embodiment of the spectrometer device 112 as illustrated in FIGS. 1A and 1B can also be implemented with absorptive sidewalls (not depicted here).

Figure 2:
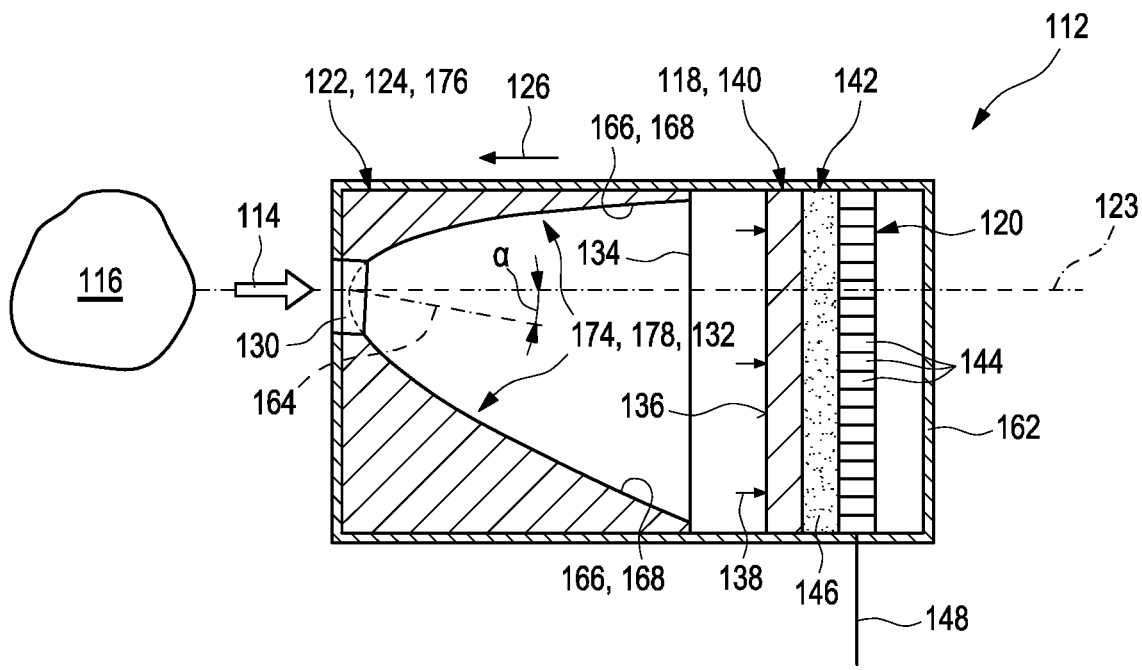
FIGS. 2A and 2B show top views of two exemplary embodiments of preferred non-conical shapes of the optical concentrator device.
Figure 2:
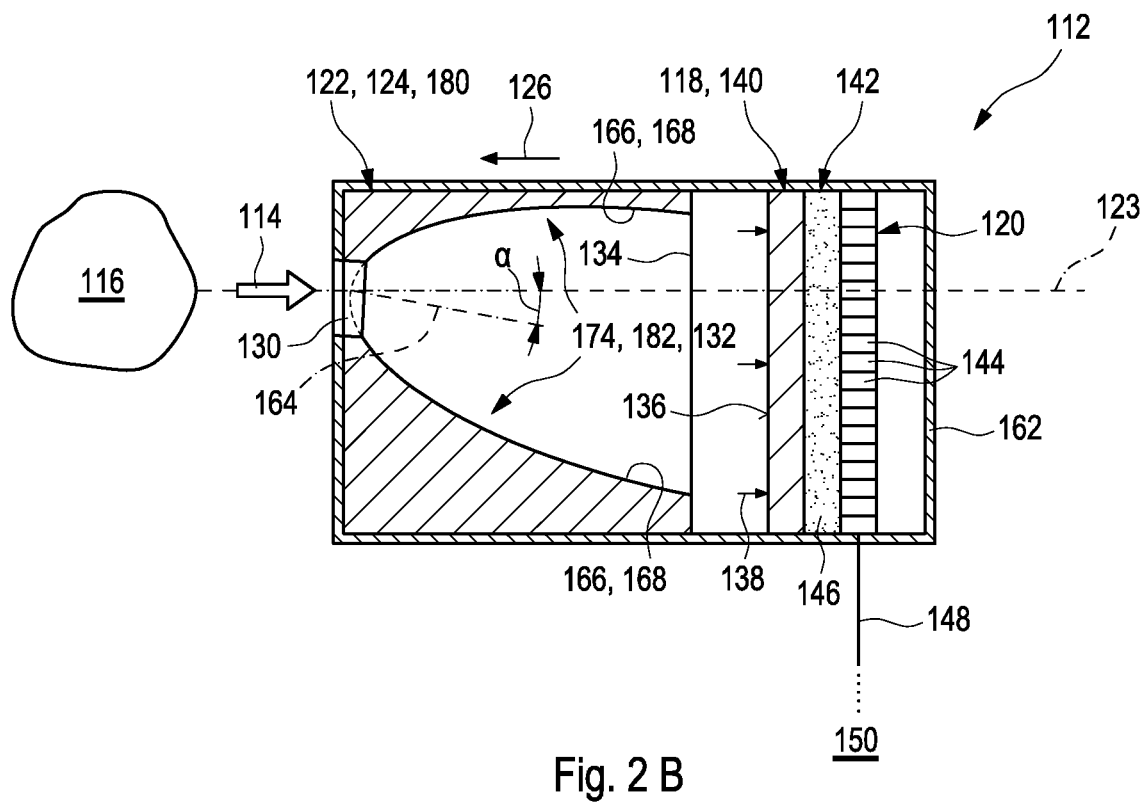

FIGS. 2A and 2B illustrate top views of two exemplary embodiments of preferred non-conical shapes 174 of the inversely-operated optical concentrator device 124. FIG. 2A schematically depicts a compound parabolic concentrator 176 in which the non-conical shape 174 of the optical concentrator device 124 comprises a parabolic shape 178 while FIG. 2B schematically depicts a compound elliptical concentrator 180 in which the non-conical shape 174 of the optical concentrator device 124 comprises an elliptical shape 182. However, the inversely-operated optical concentrator device 124 may also assume a further shape being non-conical. For further details of the non-conically shaped inversely-operated optical concentrator device 124 of FIGS. 2A and 2B reference may be made to the description of the conically shaped inversely-operated optical concentrator device 124 of FIG. 1A.

Figure 3:
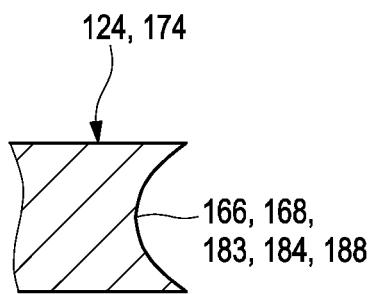
FIGS. 3A to 3D show side views of exemplary embodiments of preferred profiles of sidewalls of the optical concentrator device.
Figure 3:
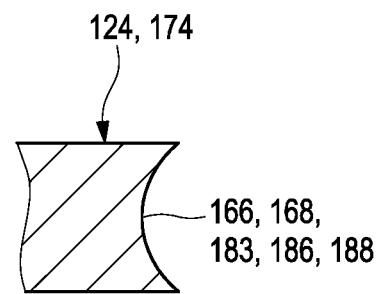
Figure 3:
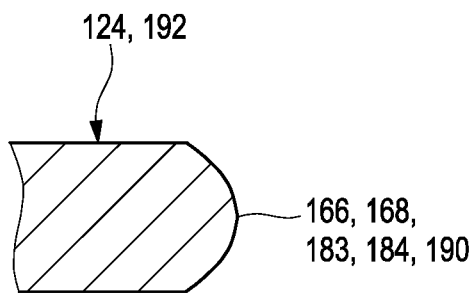
Figure 3:
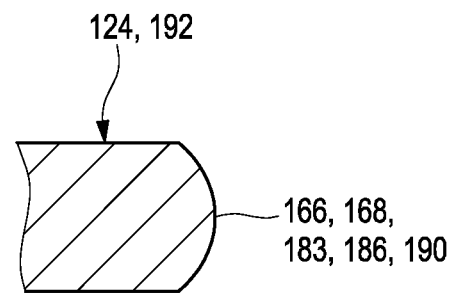

Further, FIGS. 3A to 3D show side views of exemplary embodiments of preferred profiles 183 of the individual sidewalls 166 being located at lateral positions with respect to a longitudinal axis of the inversely-operated optical concentrator device 124 according to the present invention. As illustrated herein, the individual sidewalls 166, in particular the reflective sidewalls 168, are rounded sidewalls, in particular, in order to further increase the efficiency of the spectrometer device 112. Hereby, the profile 183 of each of the individual sidewalls 166 can, preferably, be selected from a parabolic profile 184 as illustrated in FIGS. 3A and 3C or from an elliptical profile as illustrated in FIGS. 3B and 3D. Herein, the rounded sidewalls may, as depicted in FIGS. 3A and 3B, assume an intruding profile 188 which may intrude into the surface of the hollow body 178 which may constitute the inversely-operated optical concentrator device 124. As an alternative schematically depicted in FIGS. 3C and 3D, the rounded sidewalls may assume a protruding profile 190 which may protrude from the surface of the optical concentrator device 124 when the optical concentrator device 124 may be or comprise a full body 192 of an optically transparent material as described elsewhere in more detail. However, further alternatives as shown in FIGS. 3A to 3D may also be applicable for the sidewalls 176 of the inversely-operated optical concentrator device 124 according to the present invention. Herein, the sidewalls 166 of the optical concentrator device 124 may be uniformly shaped or may comprise different types of shapes at different locations. In particular, opposing sidewalls of the optical concentrator device 124 may be implemented in the same fashion or, as an alternative, in different manners. By way of example, one of the sidewalls 166 of the optical concentrator device 124 may comprise a first kind of profile while the opposing sidewall 166 of the optical concentrator device 124 may comprise a second kind of profile differing from the first kind of profile.

Figure 4:
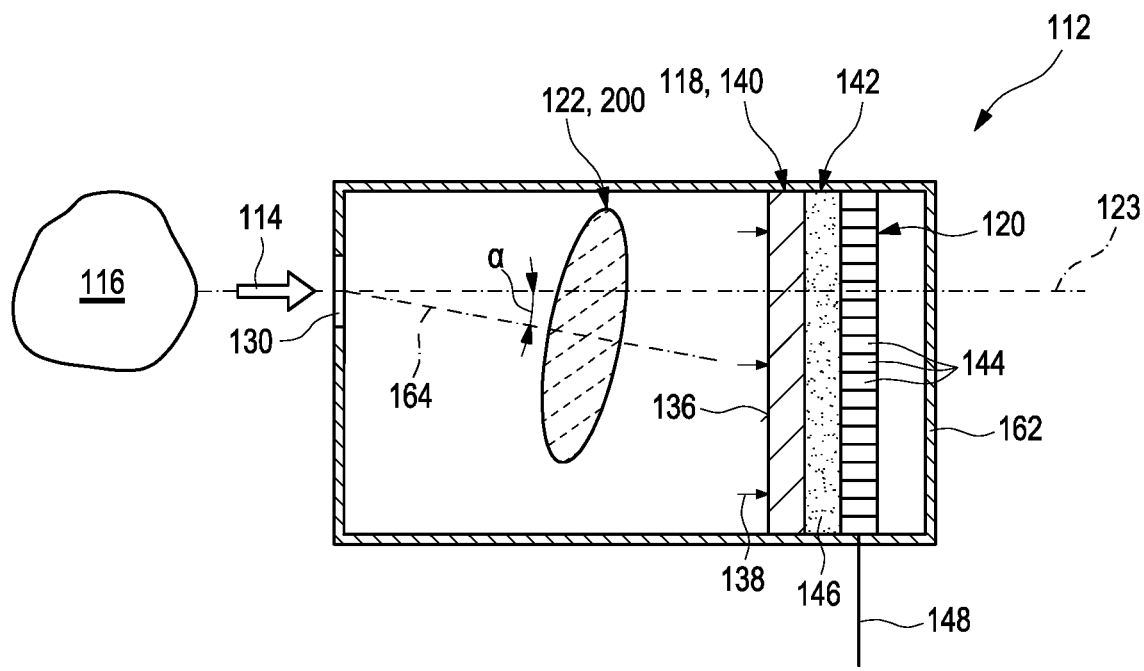
FIG. 4 shows a top view of a further exemplary embodiment of the spectrometer device using an asymmetric lens arrangement.

FIG. 4 shows a top view of a further embodiment, in which a transfer element 200 which may, in particular, be or comprise the refractive lens 202 may, preferably, be arranged as the optical element 122 between the object 112 and the linearly variable filter 118. Preferably, the refractive lens 202 may, especially, be selected from a group consisting of a biconvex lens 204, a plano-convex lens, a biconcave lens, a plano-concave lens, an aspherical lens, a cylindrical lens and a meniscus lens, wherein the biconvex lens 204 may especially be preferred. As schematically depicted in FIG. 4, the refractive lens 202 may, preferably, comprise a symmetric body which may, however, be arranged in an asymmetric manner with respect to the optical axis 123 such that the incident light 114 is transferred to the linearly variable filter 118 along a light path which is asymmetric to the optical axis 123. Specifically, the symmetry axis 164 of the refractive lens 202 may be tilted by an angle α with respect to the optical axis 123 of the spectrometer device 112 which is, preferably, parallel to the plane which is perpendicular to the receiving surface 136 of the linearly variable filter 118. However, other kinds of transfer elements 200, in particular a compound lens (not depicted here), and further kinds of arrangements thereof may also be feasible. As a result, the tilted refractive lens 202 may be used here for generating a tilted light cone, wherein all incoming light beams may be arranged in a manner that they may be directed towards a spatial position 138 on the linearly variable filter 118 which may be adapted for receiving the longer wavelengths.

Figure 5:
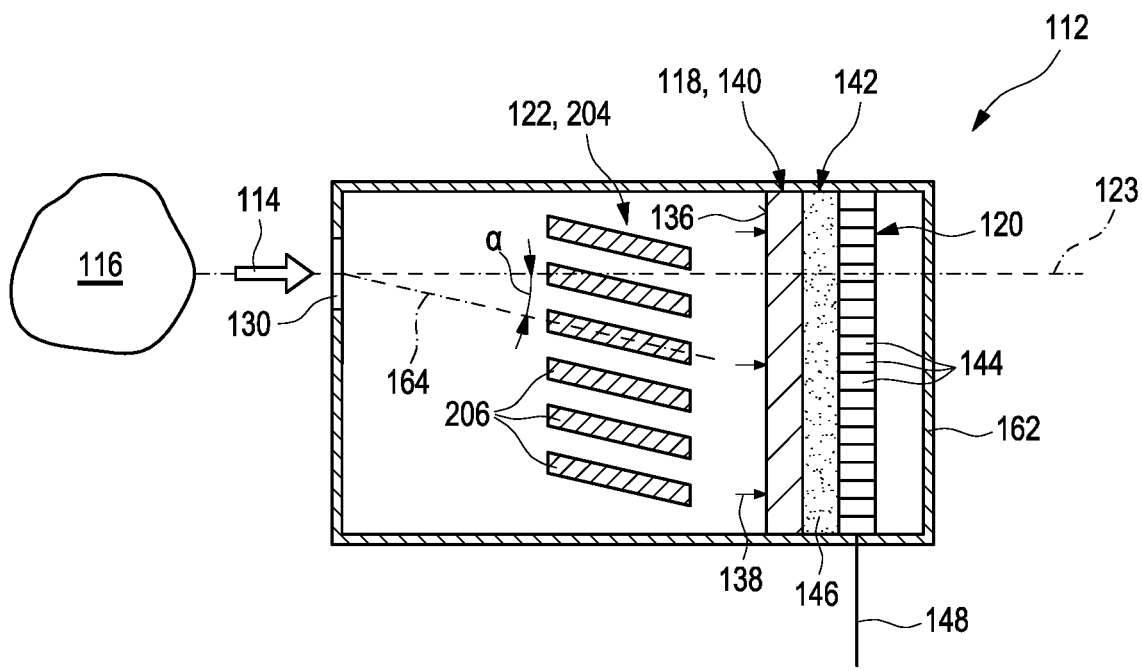
FIGS. 5A and 5B show top views of further exemplary embodiments of the spectrometer device using asymmetric baffle arrangements.
Figure 5:
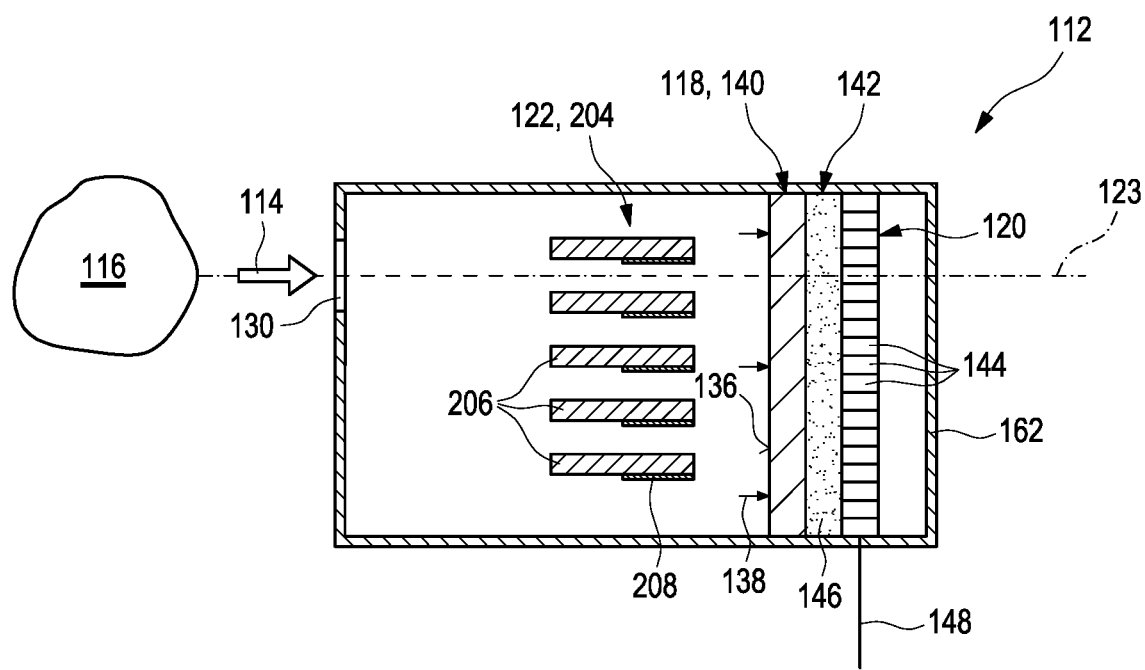

FIGS. 5A and 5B show top views of further exemplary embodiments of the spectrometer device 112 in which at least one baffle 204 is used in an asymmetric arrangement. However, further kinds of asymmetric baffle arrangements may also be conceivable.

As schematically depicted in FIG. 5A, the baffle 204 which comprises a number of planar baffle plates 206 are arranged parallel with respect to each other. Herein, the incident light beam can, preferably, pass between two adjacent baffle plates 206 such that light beams which are parallel to the arrangement of the baffle plates 206 may pass the baffle 204 whereas light beams exhibiting a different angle of incidence into the baffle 204 are likely to be reflected or absorbed, depending on the design of surfaces of the baffle plates 206. In order to achieve the desired asymmetric arrangement according to the present invention, the baffle 204 in the exemplary embodiment of FIG. 5A is tilted by an angle α with respect to the optical axis 123 of the spectrometer device 112 which is, preferably, parallel to the plane which is perpendicular to the receiving surface 136 of the linearly variable filter 118. As a result, the tilted baffle 204 may be used here for guiding all incoming light beams in a manner that they may be directed towards a spatial position on 138 the linearly variable filter 118 which may be adapted for receiving the longer wavelengths.

FIG. 5B shows further exemplary embodiments of the spectrometer device 112 in which the asymmetric arrangement of the baffle 204 is achieved by arranging the baffle 204 in a parallel manner with respect to the optical axis 123 of the spectrometer device 112, wherein, however, selected partitions 208 of one kind of surfaces of the baffle plates 206 are coated. Herein, the coating may be achieved by using a known coating method, in particular, tilted vacuum deposition. However, other kinds of coating methods may also be applicable. As a result, the incident light beam can, preferably, pass between two adjacent baffle plates 206 such that light beams which are parallel to the arrangement of the baffle plates 206 may pass the baffle 204 whereas light beams exhibiting a different angle of incidence into the baffle 204 are likely to be reflected or absorbed, depending whether they may impinge on the selectively coated partitions 208 of one side of the surfaces of the baffle plates 206.

LIST OF REFERENCE NUMBERS 110 spectrometer system
112 spectrometer device
114 incident light
116 object
118 linearly variable filter as a preferred example of a length variable filter
120 detector array
122 optical element
123 optical axis
124 inversely-operated optical concentrator device
126 reverse direction
128 conical shape
130 input
132 guiding structure
134 output
136 receiving surface
138, 138' spatial position
140 response coating
142 transparent substrate
144 pixelated sensor
146 transparent gap
148 signal lead
150 evaluation unit
152 signal evaluation unit
154 illumination source
156 incandescent lamp
158 illumination control unit
160 data processing device
162 housing
164 symmetry axis
165 hollow body 166 individual sidewall
168 reflective sidewall
170, 170', 170", 170* light beam
172 detector signal
174 non-conical shape
176 compound parabolic concentrator
178 parabolic shape
180 compound elliptical concentrator
182 elliptical shape
183 profile
184 parabolic profile
186 elliptical profile
188 intruding profile
190 protruding profile
192 full body
200 transfer element
202 refractive lens
204 baffle
206 baffle plates
208 selectively coated partitions

The invention claimed is:

1. A spectrometer device, comprising:
an optical element designed for receiving incident light from an object and transferring the incident light to a length variable filter, wherein the optical element is arranged in a manner that the incident light is transferred to the length variable filter along a light path which is asymmetric with respect to an optical axis of the spectrometer device;
the length variable filter which is designated for separating the incident light into a spectrum of constituent wavelength signals; and
a detector array comprising a plurality of pixelated sensors, wherein each of the pixelated sensors is adapted to receive at least a portion of one of the constituent wavelength signals, wherein each of the constituent wavelength signals is related to an intensity of each constituent wavelength;
wherein the optical element is selected from the group consisting of an optical concentrator device operated in reverse direction having an asymmetric property and a baffle filter having an asymmetric property.

2. The device according to claim 1, wherein the optical element is the optical concentrator device operated in a reverse direction, and wherein the optical concentrator device has an asymmetric design with respect to the optical axis of the spectrometer device.

3. The device according to claim 2, wherein the optical concentrator device comprises a conical shape or a non-conical shape, wherein the non-conical shape of the optical concentrator device comprises a shape selected from a parabolic shape or an elliptical shape.

4. A spectrometer system, comprising
a spectrometer device according to claim 1; and
an evaluation unit designated for determining information related to a spectrum of an object by evaluating detector signals provided by the spectrometer device.

5. The device according to claim 2, wherein the optical concentrator device is arranged in an asymmetric manner with respect to the length variable filter, wherein the optical concentrator device is tilted with respect to a plane which is perpendicular to a receiving surface of the length variable filter.

6. The device according to claim 5, wherein the optical concentrator device is tilted with respect to the plane perpendicular to the receiving surface of the length variable filter in a manner that the incident light which is transferred to the length variable filter impinges the length variable filter perpendicular to the receiving surface of the length variable filter at a spatial position on the length variable filter which is designed for receiving a wavelength of the incident light or impinges a further spatial position on the length variable filter which is designed for receiving a further wavelength which exceeds the wavelength of the incident light.

7. The device according to claim 2, wherein the optical concentrator device has at least two sidewalls which are adapted for reflecting incident light.

8. The device according to claim 1, wherein the optical element is the baffle filter, and wherein the asymmetric property of the baffle filter is selected from the group consisting of at least one of an asymmetric shape of the baffle filter and an asymmetric arrangement of the baffle filter with respect to the optical axis of the spectrometer system.

9. The device according to claim 8, wherein the asymmetric arrangement of the baffle filter comprises a tilted arrangement of the baffle filter with respect to the optical axis of the spectrometer system and/or a baffle filter comprising selectively coated partitions on a surface of baffle planes.

10. The device according to claim 1, wherein the detector array is separated from the length variable filter by a transparent gap.

11. The device according to claim 1, further comprising an illumination source adapted for illuminating the object.

12. The device according to claim 11, wherein the illumination source comprises an incandescent lamp.

13. A method of using the spectrometer system according to claim 4, the method comprising using the spectrometer system for a purpose selected from the group consisting of an infrared detection application; a heat-detection application;
a thermometer application; a heat-seeking application; a flame-detection application; a fire-detection application; a smoke-detection application; a temperature sensing application; a spectroscopy application; an exhaust gas monitoring application; a combustion process monitoring application; a pollution monitoring application; an industrial process monitoring application; a chemical process monitoring application; a food processing process monitoring application; a water quality monitoring application; an air quality monitoring application; a quality control application; a temperature control application; a motion control application; an exhaust control application; a gas sensing application; a gas analytics application; a motion sensing application; and a chemical sensing application.

14. The system according to claim 4, further comprising an illumination source adapted for illuminating the object.

15. A method of using the spectrometer device according to claim 1, the method comprising using the spectrometer device for a purpose selected from the group consisting of an infrared detection application; a heat-detection application; a thermometer application; a heat-seeking application; a flame-detection application; a fire-detection application; a smoke-detection application; a temperature sensing application; a spectroscopy application; an exhaust gas monitoring application; a combustion process monitoring application; a pollution monitoring application; an industrial process monitoring application; a chemical process monitoring application; a food processing process monitoring application; a water quality monitoring application; an air quality monitoring application; a quality control application; a temperature control application; a motion control application; an exhaust control application; a gas sensing application; a gas analytics application; a motion sensing application; and a chemical sensing application.

\* \* \* \* \*